US010853821B2

(12) United States Patent
Gilmore et al.

(10) Patent No.: US 10,853,821 B2
(45) Date of Patent: Dec. 1, 2020

(54) REALTIME LAND USE RIGHTS MANAGEMENT

(71) Applicants: Ashley A Gilmore, Houston, TX (US); David L Dewey, Grapeview, WA (US); Robert Anderson, Salt Lake City, UT (US); Gerald Gilmore, Houston, TX (US)

(72) Inventors: Ashley A Gilmore, Houston, TX (US); David L Dewey, Grapeview, WA (US); Robert Anderson, Salt Lake City, UT (US); Gerald Gilmore, Houston, TX (US)

(73) Assignee: ChainLink Technology, Inc., Houston, TX (US)

( * ) Notice: Subject to any disclaimer, the term of this patent is extended or adjusted under 35 U.S.C. 154(b) by 817 days.

(21) Appl. No.: 15/430,441

(22) Filed: Feb. 10, 2017

(65) Prior Publication Data

US 2017/0337562 A1 Nov. 23, 2017

Related U.S. Application Data

(60) Provisional application No. 62/293,348, filed on Feb. 10, 2016.

(51) Int. Cl.
*G06Q 30/00* (2012.01)
*G06Q 50/16* (2012.01)
*G06Q 50/18* (2012.01)

(52) U.S. Cl.
CPC ........... *G06Q 30/018* (2013.01); *G06Q 50/16* (2013.01); *G06Q 50/165* (2013.01); *G06Q 50/167* (2013.01); *G06Q 50/18* (2013.01)

(58) Field of Classification Search
CPC .... G06Q 50/16; G06Q 50/165; G06Q 50/167; G06Q 50/18; G06Q 30/018
See application file for complete search history.

(56) References Cited

U.S. PATENT DOCUMENTS

| 6,556,227 B1* | 4/2003 | Gantt | G06T 19/003 |
| | | | 715/805 |
| 2006/0125828 A1* | 6/2006 | Harrison | G06Q 10/10 |
| | | | 345/441 |

(Continued)

FOREIGN PATENT DOCUMENTS

WO 2017049344 A1 3/2017

OTHER PUBLICATIONS

Zevenbergen, Jaap "A Systems Approach to Land Registration and Cadastre" Nordic Journal of Surveying and Real Estate Research, vol. 1, 2004 (Year: 2004).*

(Continued)

*Primary Examiner* — Carrie S Gilkey
(74) *Attorney, Agent, or Firm* — Compass IP Law PC

(57) ABSTRACT

Land use rights management where land use rights are represented as bounded space, and portions of rights are represented as portions of whole rights. The portions are specifically designated subspaces within the bounded space. Tracking land use rights conveyance with the representations includes tracking conveyances as subdivisions of whole or partial subspaces within the bounded space, each subspace also bounded. The management system can compute subdivisions with set operations on the subspaces and bounded space.

20 Claims, 20 Drawing Sheets

(56) References Cited

U.S. PATENT DOCUMENTS

| | | | |
|---|---|---|---|
| 2011/0035304 A1* | 2/2011 | Moore | G06Q 10/025 |
| | | | 705/35 |
| 2012/0254045 A1* | 10/2012 | Orfano | G06Q 30/06 |
| | | | 705/306 |
| 2016/0140677 A1 | 5/2016 | Hejny et al. | |

OTHER PUBLICATIONS

Luccio, Matteo, "Recording, Registration, and Cadastres," Sep. 6, 2017, www.xyht.com/suveying/ recording-registration-cadastres/ (Year: 2017).

Notice of Allowance for U.S. Appl. No. 15/968,671, dated Aug. 7, 2018, 11 pages.

\* cited by examiner

| OWNERSHIP 1100 | | | | | | | | | |
|---|---|---|---|---|---|---|---|---|---|
| | | | !H1 | | | | H1 | | |
| OWNER | ADDRESS | SURFACE | EXECUTIVE | BONUS | DELAY | ROYALTY | NPRI | WI | NRI | OI |
| STATE | | 1.00000000 | – | – | – | – | – | – | – | – |
| A | – | – | 0.50000000 | 0.75000000 | 0.75000000 | 0.50000000 | 0.50000000 | – | 0.12500000 | – |
| D | – | – | – | – | – | – | – | 0.50000000 | 0.37500000 | – |
| B | – | – | 0.50000000 | 0.25000000 | 0.25000000 | 0.50000000 | 0.50000000 | – | – | – |

REFRESH     EXPORT     CLOSE

FIG. 11

RUNSHEET 1200

| GRANTOR | GRANTEE | TYPE | DATE | RECORDED | BOOK | PAGE | INSTRUMENT |
|---------|---------|------|------|----------|------|------|------------|
| STATE | A | DEED | 1750-01-01 | | | | |
| A | B | DEED | 1755-01-01 | | | | |
| B | C | DEED | 1765-01-01 | | | | |
| C | B | DEED | 1800-01-01 | | | | |
| B | A | DEED | 1900-01-01 | | | | |
| A | D | LEASE | 2000-01-01 | | | | |
| D | A | ASSIGN | 2010-01-01 | | | | |
| D | | ASSIGN | 2015-01-01 | | | | |

REFRESH          EXPORT SPREADSHEET          EXPORT FILES          CLOSE

FIG. 12

```
             PSEUDOCODE 1300

1302    CREATE OBJ {
1304         ID NAMES;
1306         ID PROPERTY;
1308         ID PROPERTY RIGHTS;
1310         GENERATE RIGHTS SETS AS RANGES;
1312         PERFORM SET OPERATIONS TO DEFINE OBJ RIGHTS;
1314         GENERATE NEW INSTANCE WITH DEFINED RIGHTS;
1316         GENERATE CHAIN RELATIONSHIPS;
1318    }
```

FIG. 13

```
             PSEUDOCODE 1400

1402    DISPLAY OBJ {
1404         GENERATE OBJ GUI FOR OBJ TYPE;
1406         ID RELATIONSHIPS FOR OBJ;
1408         ID SOURCE AND CHILD OBJ;
1410         COMPUTE RIGHTS SETS AS RANGES;
1412         GENERATE CHAIN GRAPHICS;
1414         IF INTERACTION RECEIVED {
1416              HIGHLIGHT RELATIONSHIPS;
1418         }
1420    }
```

FIG. 14

REALTIME LAND USE RIGHTS MANAGEMENT

PRIORITY

This application is a nonprovisional of, and claims the benefit of priority of, U.S. Provisional Patent Application No. 62/293,348, filed Feb. 10, 2016. That application is hereby incorporated by reference.

FIELD

Descriptions herein relate generally to property and land use rights tracking, and more particular descriptions are related to realtime tract rights management based on weighting land use rights instead of using scalar percentages.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, Tract.co. All Rights Reserved.

BACKGROUND

Real property ownership has long been the basis of wealth in human society. Real property ownership can accompany certain rights to use the land that is the subject of the real property ownership. One right that has long been part of the governance of real property is surface and mineral ownership rights. Mineral ownership is traditionally made up of multiple different rights, often referred to a "bundle of sticks." Such sticks or rights can include: Executive rights, or the right to lease; Bonus rights, or the right to receive bonus; Delay rights, or the right to receive delay rentals; Royalty rights, or the right to receive royalty; and, Ingress/Egress rights, or the right to enter property.

Each right can be severed from any other, and can be separately conveyed or reserved. Each right ties back to the other. In addition to being able to separately convey individual rights, each right can be conveyed in whole or in part, and based on specified extents of horizontal property coordinates (i.e., specified plots), depth, in time, and separately for different minerals. The conveyances can thus result in multidimensional tracking problems, where each separate right can be conveyed in any of the other dimensions or axes of extent of conveyance.

Natural human understanding is generally limited to conceptualizing in three dimensions, since we are familiar with three dimensional space. However, when property rights management can involve five or six dimensions, depending on how the rights are split, it is outside normal human conceptual understanding. As a result, despite hundreds of years of such property rights conveyances, there are no solutions to guarantee that the conveying party has the ability to convey the exact rights promised.

Thus, throughout history and even today, interest is error prone and tracked totally by hand. The modern creation of spreadsheets has brought more order to the issue, but the author must traditionally set to memory the individual's names and aliases and do the best job they can of tracking the interest throughout time as mergers of interest collide across the title chain. All forms of charts are complicated and nearly impossible to interpret or follow, and do not enable the natural tracking of all possible dimensions.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

FIG. 11 is a representation of an embodiment of a graphical ownership report.

FIG. 12 is a representation of an embodiment of a graphical runsheet report.

FIG. 13 is a representation of an embodiment of pseudo-code for a conveyance management engine.

FIG. 14 is a representation of an embodiment of pseudo-code for a display of a conveyance management engine.

Figure 1A:
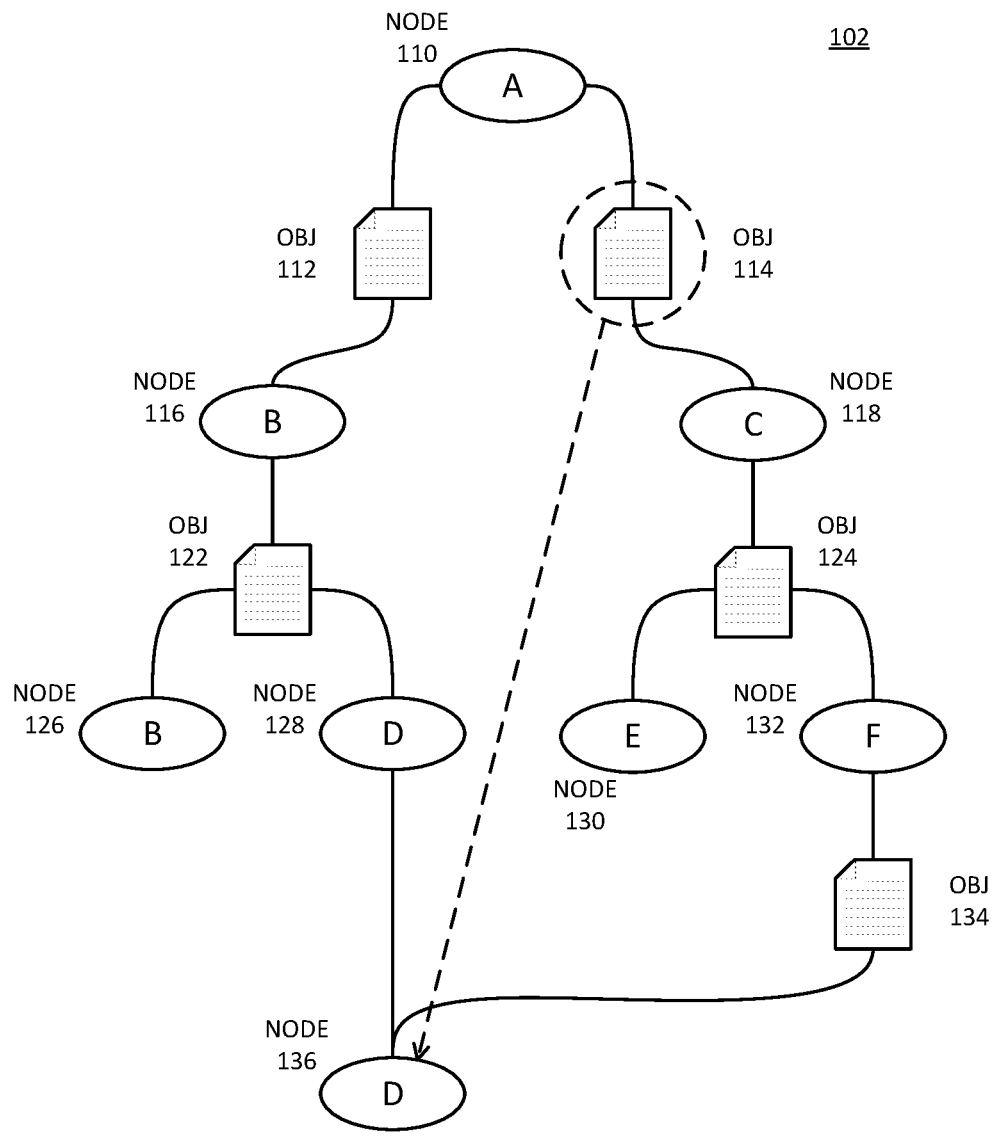
FIG. 1A is a representation of an embodiment of a conveyance flowchart illustrating influence of one conveyance document over another portion of the chain of title.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a system provides realtime land use rights management. The realtime land use rights management represents in real time the conveyance information entered. The system computes chain of title information in multidimensional space to provide an accurate representation of rights conveyed. The system can implement land rights objects that include properties that have ranges of affected rights. In one embodiment, the system generates an interactive graphical model of the chain of title. Such a model can be or include a flowchart illustrating conveyance information and relationships between conveyance instruments. The system can compute and graphically represent relationships between conveyance instruments or documents. In one embodiment, the graphical representations include lines or other graphical relationships connecting conveyance instruments to indicate influence of one instrument to other instruments downstream (later in time) and/or show influence based on source (documents earlier in time).

In one embodiment, the management system includes computer equipment configured to execute a management engine. The management engine includes configuration to compute conveyance information in multiple dimensions. In one embodiment, the management engine generates objects that manage the multidimensional conveyance information and relationships. In one embodiment, the management system includes a rendering engine to generate a graphical representation of the conveyance information.

The management system represents a land use right as a bounded space. In one embodiment, the system generates or modifies one or more objects that include the bounded space information as operable properties of the object. The object can be generated as multiple instances to represent distinct transactions and historical documents related to the property rights. The object instances can include relationships that manage the influence of one transaction on another, including traceable rights to source and to children or progeny of the documents, referring to conveyance transactions and information that comes later in time.

Within the management system, the right can be conveyed in whole or in part, and the management system creates a representation of a partial right as a portion of the whole right, which is a specifically designated subspaces within the bounded space. In one embodiment, the partial right is represented as an interval, or a vector, or other weighted object, which includes specific upper and lower bounds within the bounded space. For example, the whole bounded space can be represented as having an interval of 1.0, and a half portion can have an interval of 0.5. However, instead of only having a scalar value to represent the amount of the portion, as has previously been done, the management system represents a half portion specifically by the upper and lower bounds of the conveyance. For example, a half portion can be an interval of 0 to 0.5, or 0.25 to 0.75. Thus, the management system can accurately track not only the scalar amounts of conveyances, but also preserve the precise rights conveyed. By making the specific intervals be operable properties of the weighted object, the system can track whole or partial conveyance of specific rights across multiple dimensions, and represent the information in a manner that is trackable and understandable to a person.

Consider a specific example where A has 100% of the executive right and B has 100% of the royalty of the exact same plot of land. B has no right to lease, but only to receive a Royalty from the lease that A signs. The management system can represent A's rights as 0-1 for executive rights of a specific plot of land, and B's rights as 0-1 for royalty rights for the same plot. As the example stands, there is little confusion. However, if A and/or B further convey portions of rights to other parties who may then also convey all or portions of rights, and certain parties convey rights to each other, it can become difficult if not impossible to track who has what rights. However, the management system can keep track of specific conveyances and preserve the conveyance information through the entire chain of title.

Consider a second specific example where A has 100% of everything and conveys 50% to B and 50% to C. B then severs the Executive right and conveys it to C. If C later severs his executive right and gives it to B, when C signs a lease he is now leasing B's Royalty and when B signs a lease he is leasing C's Royalty. The royalty and the executive rights tie directly back to the original interest they were severed from. This is a relatively simple example considering it deals with only the severing of two rights from the whole, and considering a single plot of land.

However, in practice all rights can be severed on any axis and throughout time, which can create a 6 dimensional space to be tracked. The axes of the 6 dimensional space can include an x-axis and a y-axis indicating horizontal or acreage splits, a z-axis indicating depth or formation, a t-axis indicating time, an m-axis indicating mineral type, and an r-axis indicating type of right. An example of x-axis and y-axis severing can include A conveying the Southeast quarter of a 10-acre tract named Whiteacre to B. An example of a z-axis severance is that any one or more of the rights can be conveyed for any depth (e.g., 1000'-2000') or formation (the Eagleford Resource formation). An example of a t-axis severance can include C conveying a 5-year term lease or a life estate to D. An example of an m-axis severance can include E conveying rights for any one or more (separately or together) of oil, gas, coal, or other mineral rights, or a combination. The r-axis can also be referred to as an "interest axis," referring to how much interest is owned in each of the "bundle of sticks."

In one embodiment, the management system tracks each element of information about mineral ownership and/or other land use rights and relates them to each other. In one embodiment, the management system represents each mineral ownership or land use right ownership as an interval on the real number line. For example, the management system can use any consecutive interval as defined in the system, such as the interval from 0 to 1 to represent 100% ownership of a specific right. Such a system using the interval from 0 to 1 can subdivide the ownership into portions of the whole, for example, down to hundredths (0.01 granularity) or thousandths (0.001 granularity). Alternatively, a system could use an interval of 0 to 100, 0 to 1000, or other interval as will be understood by those skilled in the art. The intervals create a bounded space to represent ownership of a right.

For any conveyance of rights, the management system can apportion or represent the conveyance as a specific sub-portion or sub-interval of the interval. The portion of rights conveyed can also be a bounded space within the bounded space of the whole. For example, if A owns 100% and conveys 50% to B and 50% to C, the management system can represent the rights ownership as B having interval 0 to 0.5, and C having interval 0.5 to 1. A will now have nothing. This allows every piece of information related to mineral ownership and/or land use rights to be tied back to where the right originated. Thus, for example, every ownership can be related back to specific conveyances and specific source rights that resulted in the rights conveyed.

In one embodiment, the management system manages rights including computation of rights and ownership. The system can compute the subdivisions of rights, and determine specifically what rights were conveyed. In one embodiment, when intervals or other vectors or comparable mechanism is used, the management system can use set theory operations to perform conveyance calculations. Such set operations can include set intersections, unions, negations, subtractions, or other set theory operations, or a combination. Thus, the system can operate on an object or object instance with set operators to perform modifications to rights, either generating a new object with the changed information (e.g., a new instance), or modifying an object instance, or both.

It will be understood that an object refers to a defined structure of properties, including configuration properties and operational properties. The configuration properties define the values associated with the fields of the object structure. The operational properties refer to interfaces, calls, permissions, and other elements of an object that define its use, operation, interaction, or other implementation. An object typically refers to a class or type of component that can be created in accordance with the defined object structure, and an instance refers to that structure populated with information in at least one of the fields. Typically an instance is given a handle or name or other mechanism to call the object instance for use.

Returning to the discussion of computation of rights and ownership, consider the following example: Assume A owns 100% royalty rights, which A splits between B and C. A started out with [0-1], and B ends up, for example, with [0-0.5], and C with [0.5-1]. It will be understood that the endpoints of rights ownership intervals can represent asymptotes, in which the parties do not have overlapping rights, but the whole rights can be represented. Assume now that B conveys 50% rights (interval [0.25-0.5]) to D, and C splits its rights to E and F, with E owning [0.5-0.75] and F owning [0.75-1]. D can acquire F's rights and own the royalty rights on the interval [0.25-0.5, 0.75-1]. As such, D owns 50% of the total royalty for the tract, but the management system can identify what specific portions are owned by D. Such specificity of portions is different than traditional methods of tracking, which would simply indicate that D owns 50%, and further information would be needed to try to track down what is represented by D's ownership.

Assume now that G owns the executive rights on the interval [0-0.45, 0.95-1], which is coincidentally also 50%. If G executes a lease, to figure what royalty from the lease applies to D's royalty ownership, in one embodiment, the management system intersects D's royalty interval with the leased executive interval of G, to generate the new interval [0.25-0.45, 0.95-1], which is the portion of D's royalty that is affected by G's lease, or 25% of total tract royalty. By tracking the specific intervals, the management system easily and accurately tracks the relationship of G's lease document to D's royalty rights. Again, consider the difference in simply saying that G owns 50% of executive rights, and trying to track down whether and how much of G's 50% affects D's 50% ownership. What appears on its face as a simple question can have significant complexity, which can be managed by the system described herein that generates and manages weighted objects to track specific conveyance information.

Referring specifically to mineral rights for one example, it will be understood that multiple intervals of different ownership rights and multiple mineral depths, acreages, geologic formations, minerals, and/or other severances and ownership-related objects can be represented and operated on using set theory, in accordance with what is described herein. The contents of a set can be represented in many ways.

In one embodiment, the management system generates an expression including a union of terms, where each term is an intersection of objects. In one embodiment, another representation is an intersection of terms where each term is a union of objects. The unioned term representation can be converted to the intersected term representation with an algorithm applying the distributive law.

In one embodiment, the following set operations can be applied by the management system.

Sets can be unioned by converting all sets to the unioned term representation, then combining all of their terms, then simplifying out redundant terms. Similarly, sets can be intersected by converting all representations to intersections of terms, combining terms, and simplifying out redundant terms.

A set can be negated by negating each object in the set (such as by applying a Boolean negation flag to each object in the set, or by performing a negation operation on the object, if it supports one) and converting every union to intersection and every intersection to union (e.g., applying deMorgan's law).

Two sets can be "subtracted" (i.e., keep everything in set A that isn't in set B) by negating set B and intersecting the result with set A.

The examples above do not provide an exclusive list of set operations the management system can apply, and are to be understood illustratively rather than restrictively. In one embodiment, the management system includes set operation capability defined in code, to compute the sets of ownership that each owner ends up with after each legal instrument is applied to the title chain. As in the simple interval example above, it allows different pieces of ownership to be related back to each other via intersection and other operations to determine which part of which ownership applies to which part of other ownerships, and thus distribute lease royalties and other interests correctly.

FIG. 1A is a representation of an embodiment of a conveyance flowchart illustrating influence of one conveyance document over another portion of the chain of title. Diagram 102 represents a conveyance from A to B and C, a partial conveyance from B to D, a full conveyance from C to E and F, and a conveyance from F to D. While percentages of ownership transfer are not shown, it will be understood that any amount of conveyance of any rights could be represented by the various conveyance documents shown. As illustrated, the last conveyance includes a conveyance from F to D, in which case the conveyance from A to C will influence the ownership rights of D.

For purposes of illustration, the elements designated as letters (i.e., A, B, C, D, E, F) represent objects that indicate ownership associated with a named party, where the letters represent the different parties. It will be understood that parties to a transaction or conveyance can include natural persons or individuals, groups of individuals, legal entities (e.g., a company, a trust, or other), groups of legal entities, or a combination. The object elements that indicate the ownership interest associated with a party are referred to as nodes. Thus, the initial node 110 indicates the whole ownership interest of party A, which is then conveyed as provided in diagram 102. It will be understood that A's ownership interest can be the whole ownership interest of a piece of real property, or could be a partial ownership, where diagram 102 only focuses on the dependent or child transactions of A's interest. Thus, diagram 102 does not necessarily indicate all dispositions of land that is the subject of the illustrated transactions.

For further purposes of illustration, the elements represented by document icons represent objects that indicate a conveyance of a part or all of one or more rights. For purposes of convention, if one party has a node prior to a conveyance, and does not have a node after the conveyance, the conveying party's interest can be considered to be completely conveyed. For example, node 110 represents A's interests, which are completely divested to B and C through object 112 (conveyance to B) and object 114 (conveyance to C) as illustrated respectively by nodes 116 and 118. In contrast, when a party includes a node before and after a conveyance, at least a portion of rights are retained. For example, node 116 represents B's interests, which are split via object 122 to B (at node 126) and D (at node 128).

It will be observed that separate conveyance documents can be used to convey to separate parties, or a single conveyance document can convey to multiple parties. For example, object 112 represents a conveyance document that provides rights to B, and is separate from a conveyance document represented by object 114 to provide rights to C. Both objects 112 and 114 provide rights from A, but are separate documents, and are thus represented by separate objects. In contrast, object 122 represents a conveyance document that provides rights to B and D, and thus, a single conveyance document as represented by a single objet 122 provides rights to both B and D. Similarly, the rights of C as represented at Node 118 are passed to E (as represented at node 130) and F (as represented at node 132) through a common conveyance document as represented by object 124.

Diagram 102 also illustrates object 134 to represent a conveyance of F's rights to D at node 135. It will be understood that node 128 represents D's rights as provided by object 122, and node 136 includes more rights, which include the rights represented at node 128 and the rights conveyed by object 134 to D. Thus, a party's right can be subtracted (as represented by node 126 of B after the conveyance of object 122) or added to (as represented by node 146 of D after the conveyance of object 134).

In one embodiment, nodes and objects represent different object types. In one embodiment, nodes are part of an object, or objects are part of the same object as a node. A node includes structured information to represent a real party in interest, the type of rights possessed, and one or more ranges indicating the amount of ownership of one or more rights. Thus, nodes can represent one or more or all rights owned by the indicated party. In one embodiment, the ranges represent bounded regions to indicate specific rights types and amounts of rights. However, bounded spaces indicate not only the amount or percentage of rights, but what specific portion of rights are possessed. For example, ownership of [0.3-0.8] is 50% ownership, as is [0.25-0.5, 0.75-1], but the specific portion of rights are different, and will have different sources, and can be separately managed as described herein.

The document objects represent conveyance document objects. The conveyance document objects include information to identify the conveying party and the receiving party, and the portion of rights conveyed. As with node objects, the conveyance objects include bounded space to identify the specific regions conveyed. It will be understood that conveyance documents do not explicitly indicate a bounded space that is to be conveyed. Rather, the conveyance documents indicate specific metes and bounds of the real property rights being transferred. The management system as described herein converts the metes and bounds into a bounded space to represent the conveyance. Thus, the system converts detailed conveyance information into a bounded space of a structured data representation or object of the management system.

Diagram 102 also illustrates another feature of the management system that becomes clear in the management system, which is not easily recognizable in traditional tracking methods. It will be, observed that D's rights at node 128 derive solely through object 112 via the conveyance from A to B. Until node 128, object 114 representing the conveyance from A to C has no direct influence on D's rights. Rather, until node 128, object 114 could be considered only to illustrate what is not conveyed through object 112, and seeing that B retains an interest, it could be said that D's entire interest is illustrated comes through object 112.

However, it will also be observed that all of F's interest is derived through object 114. Therefore, when F makes a conveyance to D through object 134, object 114 now influences D's interests at node 136. Therefore, what previously had no relationship now has a relationship or an influence. Reference to an "influence" refers to the fact that rights possessed by a party are at least partially derived through an instrument. A relationship refers to either a source (earlier in time) of rights or a receiver (later in time) of rights. The relationship identifies that the two objects are connected through chain of title, and the influence can identify the specific amount that is derived or granted with respect to a source or receiver, respectively.

While the chain of title can trace D's interests at node 136 to a conveyance document represented by object 114, with diagram 102, it can be readily seen that the conveyance of object 114 influences node 136. Also, the specific amount of influence can be represented by the bounded spaces of the ranges in the objects.

Figure 1B:
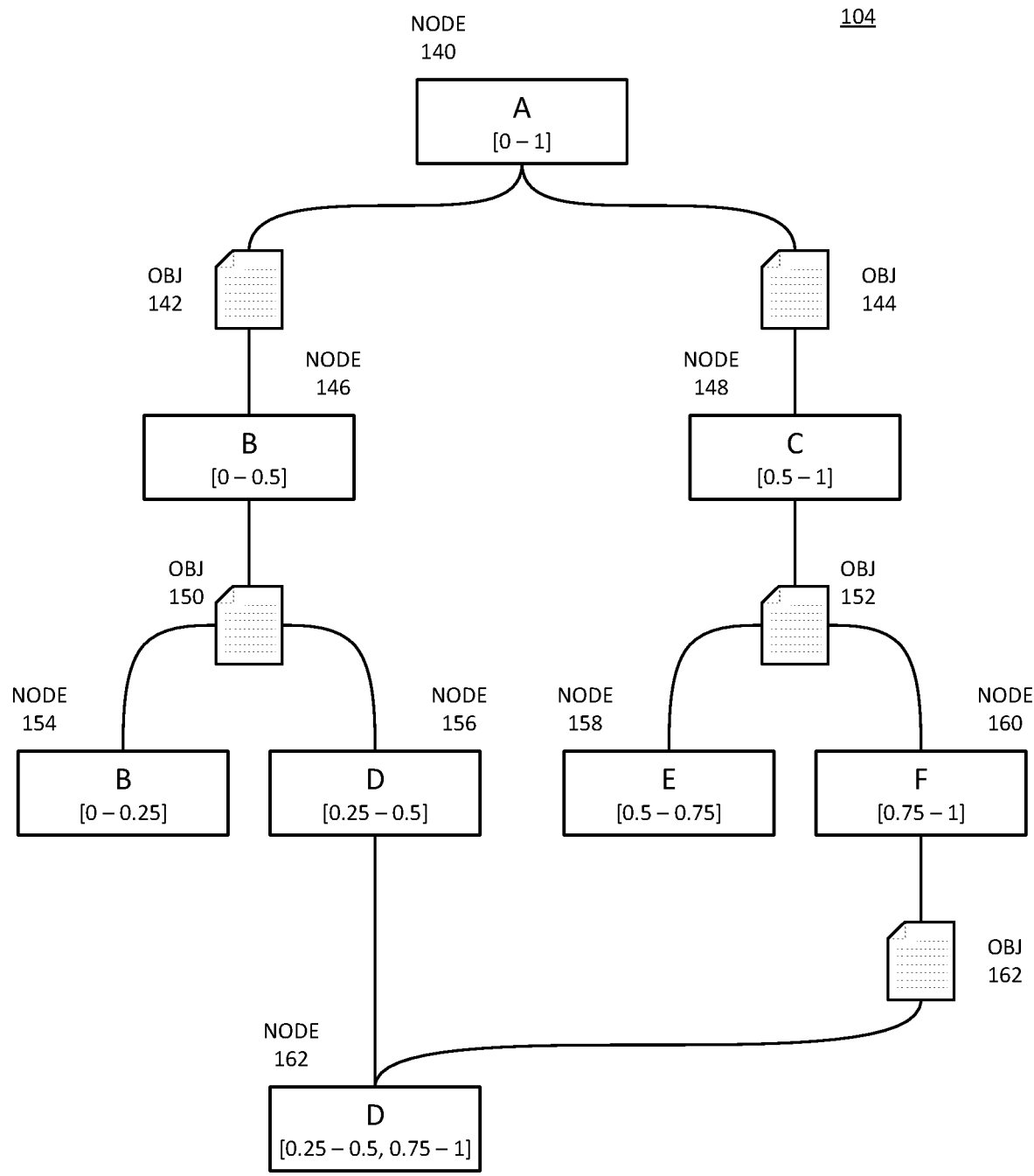
FIG. 1B is a representation of an embodiment of a conveyance flowchart illustrating ownership in accordance with interval sets.

FIG. 1B is a representation of an embodiment of a conveyance flowchart illustrating ownership in accordance with interval sets. Diagram 104 provides an alternative view of diagram 102 of FIG. 1A. More specifically, diagram 104 illustrates the same conveyance scenario as diagram 102, and illustrates specific conveyance portions. While equal percentage conveyances are illustrated, it will be understood that any percentages could be conveyed. Diagram 104 can be considered one non-limiting example of diagram 102, as it will be understood that an infinite combination of portions and conveyances can be represented for diagram 102.

Referring diagram 104, in one embodiment, a management system represents conveyances via intervals that indicate amount of ownership, as well as the specific boundaries of the rights ownership. For example, after conveyance from A, B owns a 50% ownership, and specifically the interval from [0-0.5]. It will be understood that the conveyance documents can represent one or more conveyance documents each. A single conveyance document can illustrate a conveyance to one party or to multiple parties. Multiple conveyance documents can be used to perform conveyances.

Node 140 represents a state or condition where A owns all of a property [0-1]. After conveyances represented by object 142 and object 144, two new states of possession exist. Namely the states represented by node 146 where B owns [0-0.5], and node 148 where C owns [0.5-1].

The conveyance represented by object 150 provides the new ownership states of node 154 where B owns [0-0.25], and node 156 where D owns [0.25-0.5]. The conveyance represented by object 152 creates new ownership states represented by node 158 where E owns [0.5-0.75], and node 160 where F owns [0.75-1]. Again, it will be understood that equal portions are represented merely to represent a simple case for illustration, but any range or combination of ranges can be conveyed.

The conveyance represented by object 162 transfers F's interest to D, which changes the state of ownership of D to be represented by node 162 where D owns [0.25-0.5, 0.75-1]. It will be observed that object 162 does not affect or influence the B's ownership interest in node 154 or E's ownership interest in node 158. Thus, those states of ownership remain valid, and D's and F's ownership interests have combined in D.

Any combination of scenarios is possible. The example of diagram 104 provides a simple illustration of how ownership interests can be tracked across various branches of a chain of title tree, and accounted for by the use of bounded space representations for the interests in the objects.

Figure 2:
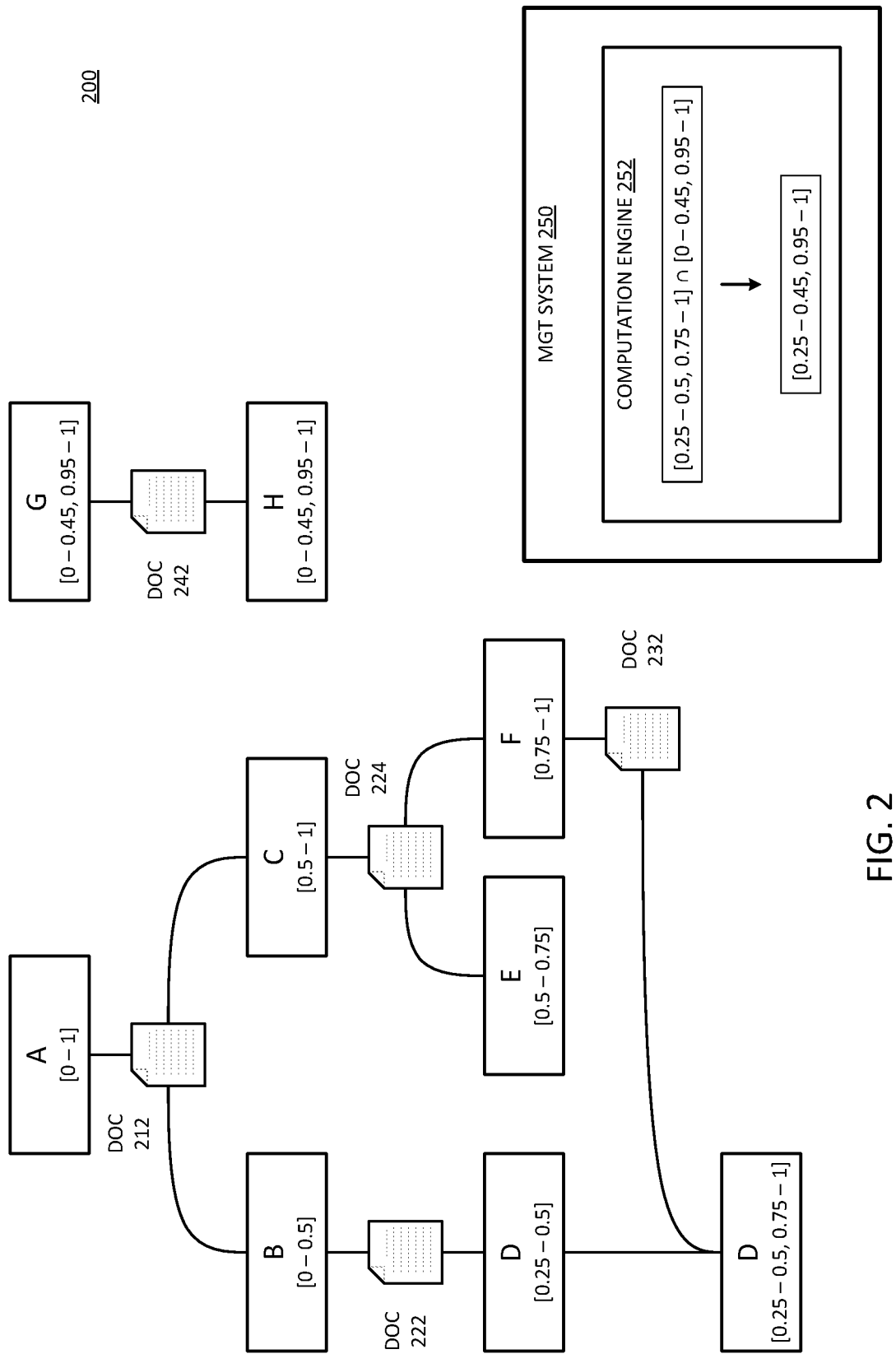
FIG. 2 is a representation of an embodiment of conveyance information in accordance with interval sets where a management system computes relationships based on set operations.

FIG. 2 is a representation of an embodiment of conveyance information in accordance with interval sets where a management system computes relationships based on set operations. System 200 illustrates two conveyance chains and an operation of the management system based on those two chains. Thus, system 200 illustrates how the management system can utilize set operators to compute interests managed as bounded spaces.

As illustrated, system 200 includes a conveyance chain for royalty rights from A to B and C, from B to D, from C to E and F, and from F to D. System 200 also includes a conveyance chain to represent an executive right. In one embodiment, the management system represents the conveyances based on intervals. For the royalty rights, consider a scenario in which A conveys [0-0.5] to B through document (doc) 12, and [0.5-1] to C through document 212, representing the rights as bounded intervals. It will be observed that documents in system 200 are referred to as "documents" rather than objects as in the previous diagrams. The change in convention is simply for purposes of illustration, to indicate that the conveyance object represent actual documents that convey interests. Thus, in system 200 the objects that represent the conveyance of interests are referred to as documents. Such documents within the context of system 200 can be understood to be object representations of the actual documents. While the actual documents will make conveyance based on specified portions of land, system 200 represents the conveyances through the objects as bounded space intervals.

The conveyances of document 212 produce ownership states in B and C. B then conveys an interest in [0.25-0.5] to D through document 222, and C conveys interest in [0.5-0.75] to E and an interest in [0.75-1] through document 224. Finally, F conveys an interest in [0.75-1] to D through document 232, and D owns [0.25-0.5, 0.75-1]. The royalty rights are simple enough to follow, and mirror what is provided in diagram 104. However, when multidimensional issues arise, following the rights becomes more complex. For example, the conveyance of G to H can represent a lease to H for [0-0.45, 0.95-1] via document 242. In one embodiment, to determine the effect of G's conveyance to H on D's rights, the management system can compute an intersection of D's interval set with H's interval set. In one embodiment, management system 250 can perform any of a variety of set operations on the sets to determine ownership. As illustrated, computation engine 252 of management system 250 executes the computations including the set operations to indicate an effect for D of [0.25-0.45, 0.95-1]. In one embodiment, computation engine 252 computes the intersection of [0.25-0.5, 0.75-1] with [0-0.45, 0.95-1] to result in [0.25-0.45, 0.95-1].

Management system 250 with computation engine 252 can compute any type of interest relationship based on the set operations on the intervals of the interacting objects. In the example provided, the object of the state of H's interest and the object of the state of D's interest are the interacting objects, and the intervals indicated result in an output object that provides for D's rights. Because the intervals preserve the specific portions of land, and the set operators preserve the relationship of the intervals, the management system can produce computations that are highly reliable. Furthermore, the rights computed can be translated back to specific identifiable land portions based on the understanding of the intervals.

Figure 3:
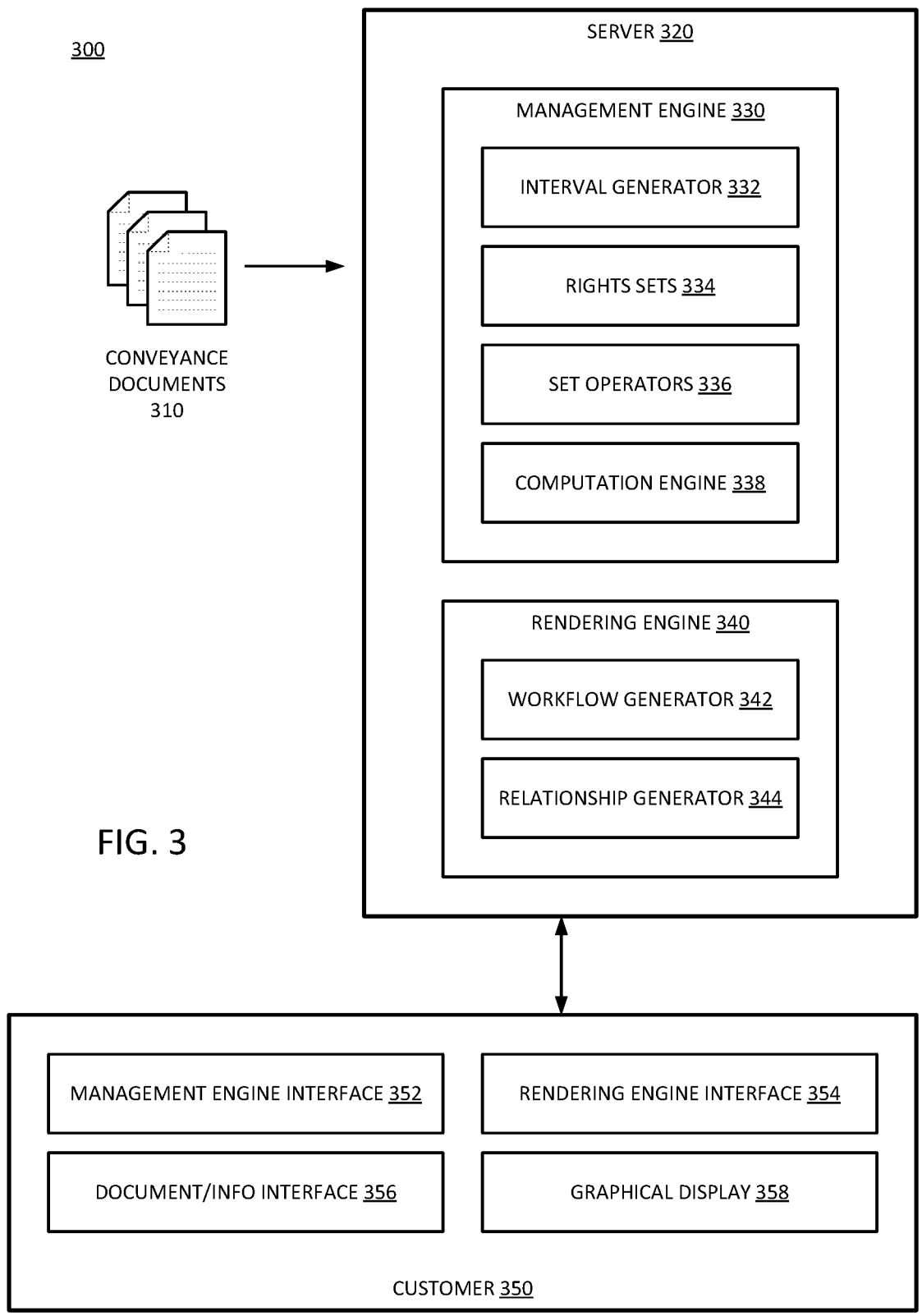
FIG. 3 is a block diagram of an embodiment of a management system.

FIG. 3 is a block diagram of an embodiment of a management system. Management system 300 represents elements that can be a part of a management system in accordance with any embodiment described throughout. Not all components will necessarily be in all management system implementations. Certain management system implementations can include elements not illustrated in system 300.

In one embodiment, management system 300 includes server 320 and customer 350. Such a management system can operate as a remote server accessed in a server-client relationship. In one embodiment, server 320 includes management engine 330 or rendering engine 340, or both. In one embodiment, server 320 provides code to customer 350, which then executes the code at the customer end rather than executing at the server end. In one embodiment, management system 300 executes the code at the server end and provides a display to customer 350.

In one embodiment, server 320 includes management engine 330. Management engine 330 can include code to be executed at the customer. Management engine 330 can include code to be executed at a server side, remote from customer 350, or over a network from customer. It will be understood that remote from the customer refers to executing on different hardware than the hardware with which a customer user interfaces. Management engine 330 can be or include a computation engine. In one embodiment, management engine 330 includes interval generator 332, rights set generator 334, one or more set operator engines 336, and computation engine 338. In one embodiment, reference to an engine can refer to the execution of a function or routine by computing hardware. Thus, the code representing the function or the routine or call can configure and guide the execution of the processing hardware to generate a transformation of data from one state to another.

In one embodiment, computation engine 338 can include set operators 336. Interval generator 332 enables management engine 330 to generate interval objects to track specific bounded ownership rights. In one embodiment, rights set generator 334 and rights sets enable management engine 330 to manage rights as sets of rights, which can then be operated on in accordance with set operations by set operators. Set operators 336 represent the ability or the engine of management engine 330 to perform set operations to manage land use rights, including the multidimensional issues associated with land use rights tracking. Set operators 336 can include code to perform specific set operations. Computation engine 338 enables management engine 330 to perform the set operations to compute ownership of rights in multiple dimensions.

In one embodiment, server 320 includes rendering engine 340. In one embodiment, rendering engine 340 includes workflow generator 342, which can enable rendering engine 340 to use conveyance information to generate a graphical representation of ownership after the conveyances. In one embodiment, workflow generator 342 can generate multiple different types of workflow representations. For example, in one embodiment, a standard workflow can show conveyance documents and relationship between them and the relationship of the conveyance documents to the parties of the conveyances. Other workflows, such as a tree structure, a timing workflow, or other workflows can be created. The workflow can be thought of as a mapping or indexing of conveyance information. In one embodiment, a workflow can include standard conveyance document layout information layered with party information.

In one embodiment, rendering engine 340 includes relationship generator 344. Relationship generator 344 enables rendering engine 340 to generate and display relationship information in the graphical representation. In one embodiment, relationship generator 344 enables rendering engine 340 to highlight influence of conveyance documents along the chain of title. For example, in one embodiment, management system 300 as executed at customer 350 generates an interactive graphical representation via rendering engine 340, and a user can select a conveyance document by clicking or hovering over the document, or through other interaction. Thus, in one embodiment, selection of a conveyance document can illustrate relationship data, including influence of the conveyance document on other conveyances or ownership or a combination.

In one embodiment, customer 350 includes one or more management engine interfaces 352. Management engine interface 352 at customer 350 can enable the customer to download code from server 320 to execute the management engine functions described with respect to management engine 330 of server 320. In one embodiment, customer 350 can operate offline after receiving code from server 320. In one embodiment, customer 350 includes one or more rendering engine interfaces 354. Rendering engine 354 interface enables customer 350 to execute the functions described with respect to the relationship rendering engine described with respect to rendering engine 340 of server 320.

In one embodiment, customer 350 includes document or information interface 356, which can enable a user to upload conveyance information into management system 300. The conveyance documents 310 represent conveyance information that can be inputted into the management system. In one embodiment, some conveyance information is input into server 320 directly, and can be used as the basis for conveyance information representations at customer. In one embodiment, all conveyance information is input via the customer conveyance information or document interface 356. In one embodiment, information input locally at customer 350 is only used locally (e.g., customer 350 can download functions from server 320). In one embodiment, information input locally at customer 350 can be used at server 320 to generate data or data objects or data representations at the server that are sent back to customer 350. Customer 350 includes graphical display 358, which can include graphical representation information generated by management system 300 (whether computed at server 320, at customer 350, or both) for the conveyance information and the ownership information generated. In one embodiment, rendering engine 340 displays information generated by management engine 300.

In one aspect, a method for land use rights management includes: representing each of multiple land use rights in an object as a bounded space, where a portion of a whole right is a specifically designated subspace within the bounded space; and managing land use rights conveyances through object interactions as subdivisions of whole or partial subspaces within the bounded space, including performing set operations on bounded spaces of interacting objects to compute the subdivisions.

In one embodiment, representing each of the multiple land use rights as a bounded space further comprises representing the land use rights as objects having the bounded space, and representing a subspace as an object having a specifically designated interval portion of the bounded space, including defined starting and ending points of the interval to preserve the specific right conveyed. In one embodiment, managing the land use rights conveyances further comprises performing a set operation on separate subspaces to compute a subdivision conveyed. In one embodiment, performing the set tracking the land use rights conveyances further comprises performing the set operation comprises performing a union operation between two or more subspaces. In one embodiment, performing the set tracking the land use rights conveyances further comprises performing the set operation comprises performing an intersection operation between two or more subspaces. In one embodiment, managing the land use rights conveyances further comprises tracking conveyances based on a combination of at least two of: right type, x-axis and y-axis tract dimensions, z-axis land depth, mineral type, and time. In one embodiment, managing the land use rights conveyances further comprises tracking conveyances based on all of: right type, x-axis and y-axis tract dimensions, z-axis land depth, mineral type, and time. In one embodiment, managing the land use rights conveyances comprises computing a subdivision conveyed based on right type intervals, x-axis tract dimension intervals, y-axis tract dimension intervals, z-axis land depth intervals, mineral type intervals, and time intervals.

In one aspect, a computing device for land use management includes: a memory device to store data related to land use rights conveyances; and a processor to generate multiple objects to represent the land use rights conveyances, including to represent each of multiple land use rights in an object as a bounded space, where a portion of a whole right is a specifically designated subspace within the bounded space; and to manage land use rights conveyances through object interactions as subdivisions of whole or partial subspaces within the bounded space, including the execution of set operations on bounded spaces of objects to compute the subdivisions.

In one embodiment, the processor is to represent the land use rights as objects having the bounded space, and represent a subspace as an object having a specifically designated interval portion of the bounded space, including defined starting and ending points of the interval to preserve the specific right conveyed. In one embodiment, the processor is to manage the land use rights conveyances including to perform a set operation on separate subspaces to compute a subdivision conveyed. In one embodiment, the processor is to perform a union operation between two or more subspaces. In one embodiment, the processor is to perform an intersection operation between two or more subspaces. In one embodiment, the processor is to manage the land use rights conveyances including to manage conveyances based on a combination of at least two of: right type, x-axis and y-axis tract dimensions, z-axis land depth, mineral type, and time. In one embodiment, the processor is to manage the land use rights conveyances including to manage conveyances based on all of: right type, x-axis and y-axis tract dimensions, z-axis land depth, mineral type, and time. In one embodiment, the processor is to manage the land use rights conveyances including to compute a subdivision conveyed based on right type intervals, x-axis tract dimension intervals, y-axis tract dimension intervals, z-axis land depth intervals, mineral type intervals, and time intervals.

In one aspect, a method includes: computing land use rights conveyances as conveyances of specified intervals of a whole land use right, where each interval includes a starting and ending point within the whole land use right, the conveyances based on conveyance instruments; generating a graphical representation of the conveyance instruments, including representing the conveyance instruments ordered in accordance with specific rights intervals affected by the respective conveyance instruments; and generating relationship lines between graphical representations of conveyance instruments, each relationship line indicating an influence of the conveyance instrument on one or more other conveyance instruments to which it is connected, the influence based on an amount of land use rights conveyed by the conveyance instrument.

In one embodiment, generating the graphical representation further comprises generating a flowchart of conveyance instruments. In one embodiment, generating the relationship lines comprises generating a relationship line between representations of two conveyance instruments to indicate an influence per interval for at least one right type, and for one or more of: x-axis tract dimension, y-axis tract dimension, z-axis land depth, mineral type, or time.

Figure 4:
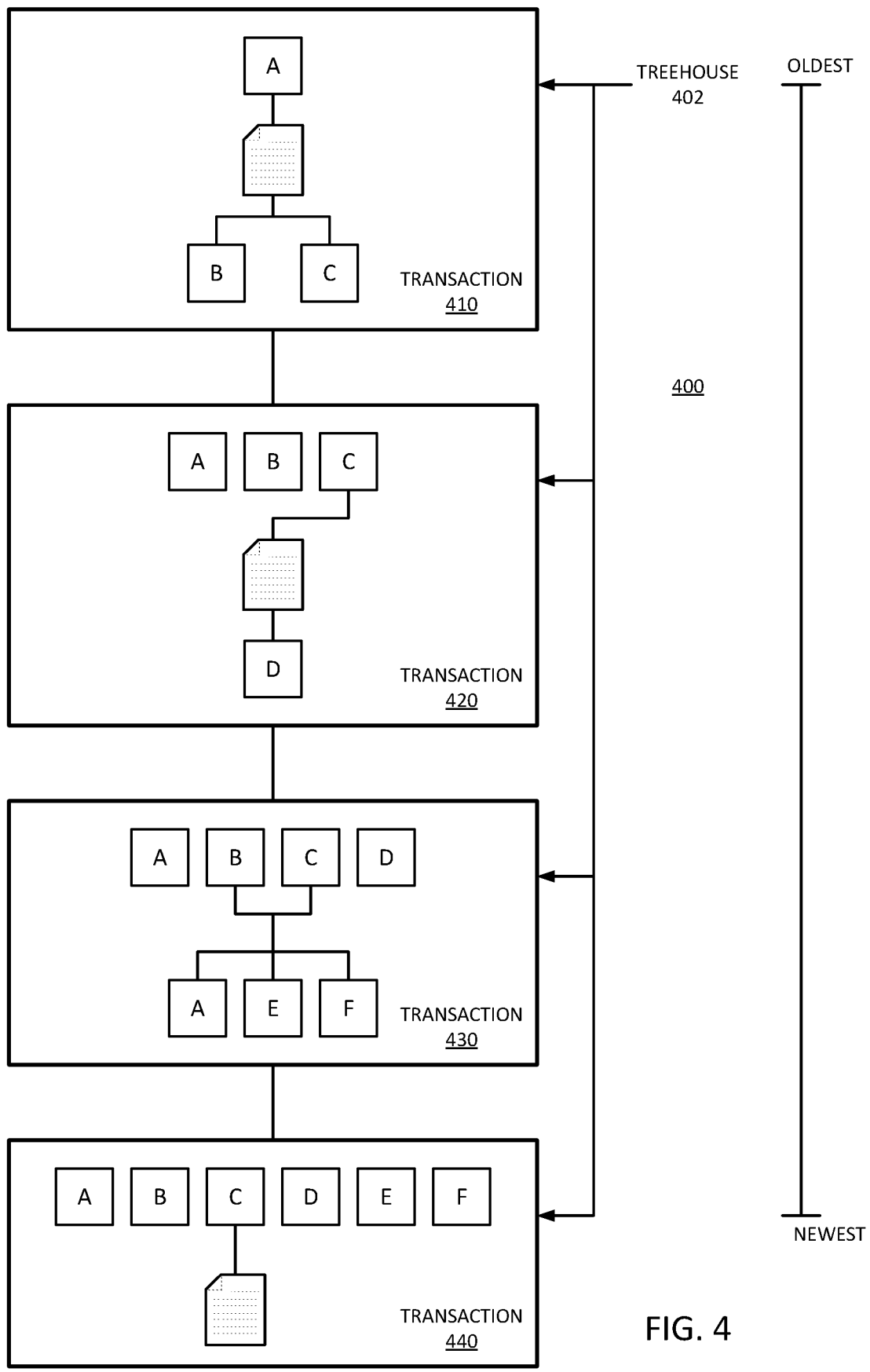
FIG. 4 is a representation of an embodiment of a treehouse view.

FIG. 4 is a representation of an embodiment of a treehouse view. Diagram 400 illustrates treehouse view 402. In treehouse view 402, the parties to a document are illustrated together in a box, and each separate conveyance document can have a different box illustrating the resulting ownership, as represented by intervals. Thus, each document or conveyance is represented as a separate transaction in treehouse view 402. In treehouse view 402, the oldest transaction or the source transactions can be set at the "top" of the page, and worked down to the newest transactions. In one embodiment, such a flow from top to bottom can be reversed.

As illustrated, transaction 410 provides a conveyance from A to B and C. In one embodiment, the management system can generate transaction 410 and the other transactions as separate objects, or as object containers, with documents and rights states for various parties being elements within the container. Transaction 420 illustrates a conveyance from C to D. It will be understood that management system can manage rights that pass through conveyance documents as well as operations of law (succession, inheritance, or other operation). While a specific document is not illustrated in transaction 430, interests of B and C pass to A, E, and F through a single transaction, or a series of related transactions. In one embodiment, the management and view can be configurable to provide the desired type of illustration. Transaction 440 illustrates a conveyance of rights from C. The receiving party is not illustrated, but can be include in the representation if known.

Figure 5:
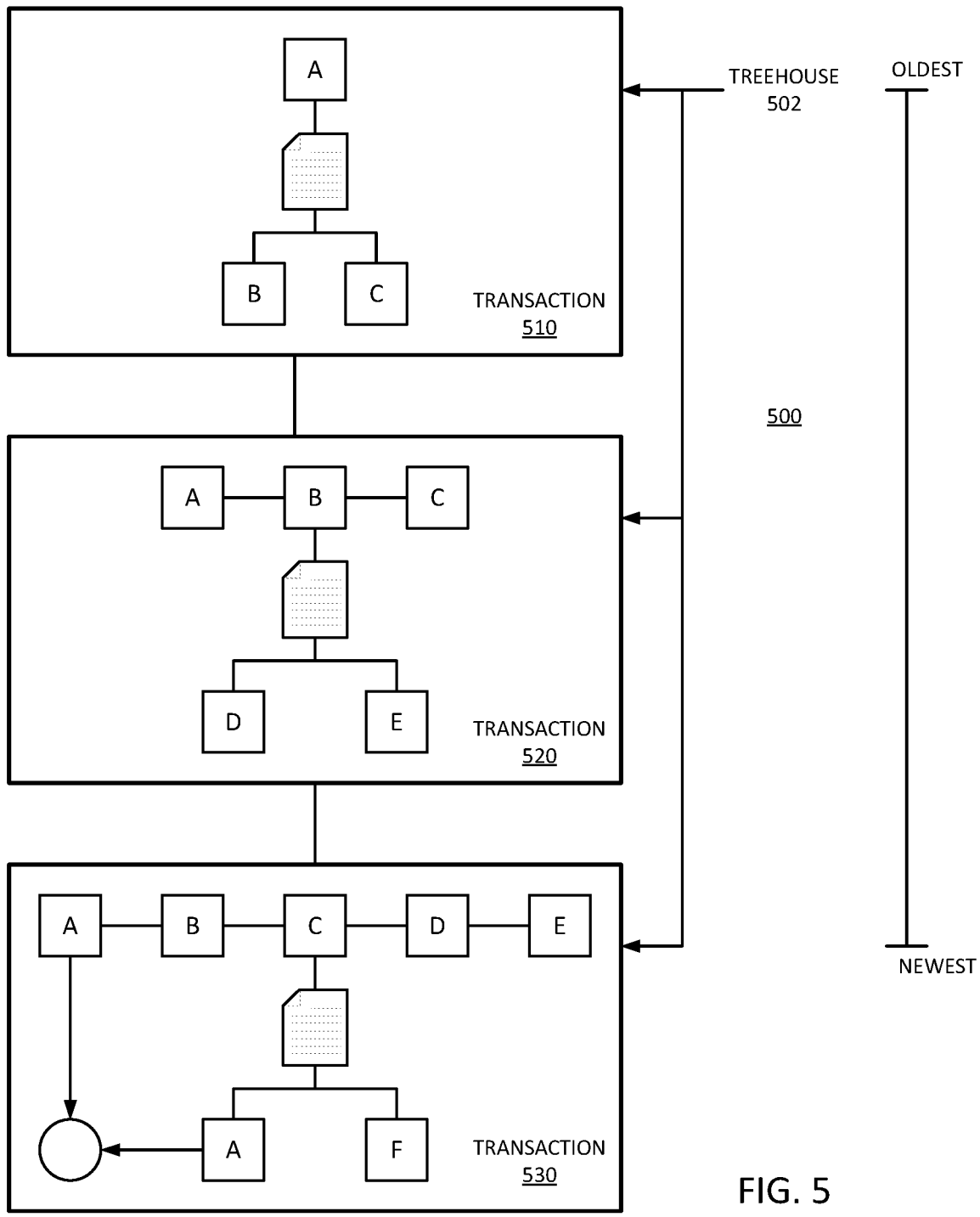
FIG. 5 is a representation of an alternative embodiment of the treehouse view.

FIG. 5 is a representation of an alternative embodiment of a treehouse view. Diagram 500 represent treehouse view 502, which illustrates an embodiment of a visualization where residual rights information can be represented in a particular box, such as the circle in the bottom box of transaction 530. Thus, for example, transaction 510 represents a conveyance from A to B and C. Transaction 520 represents a conveyance from B to D and E. It will be understood that A and C retain rights as illustrated in transaction 520. In transaction 530, C conveys rights to A and F, while A already had rights previously. Thus, the circle can represent the combination of rights that reside in A after the conveyance of transaction 530, and include the previous rights or interests.

Figure 6:
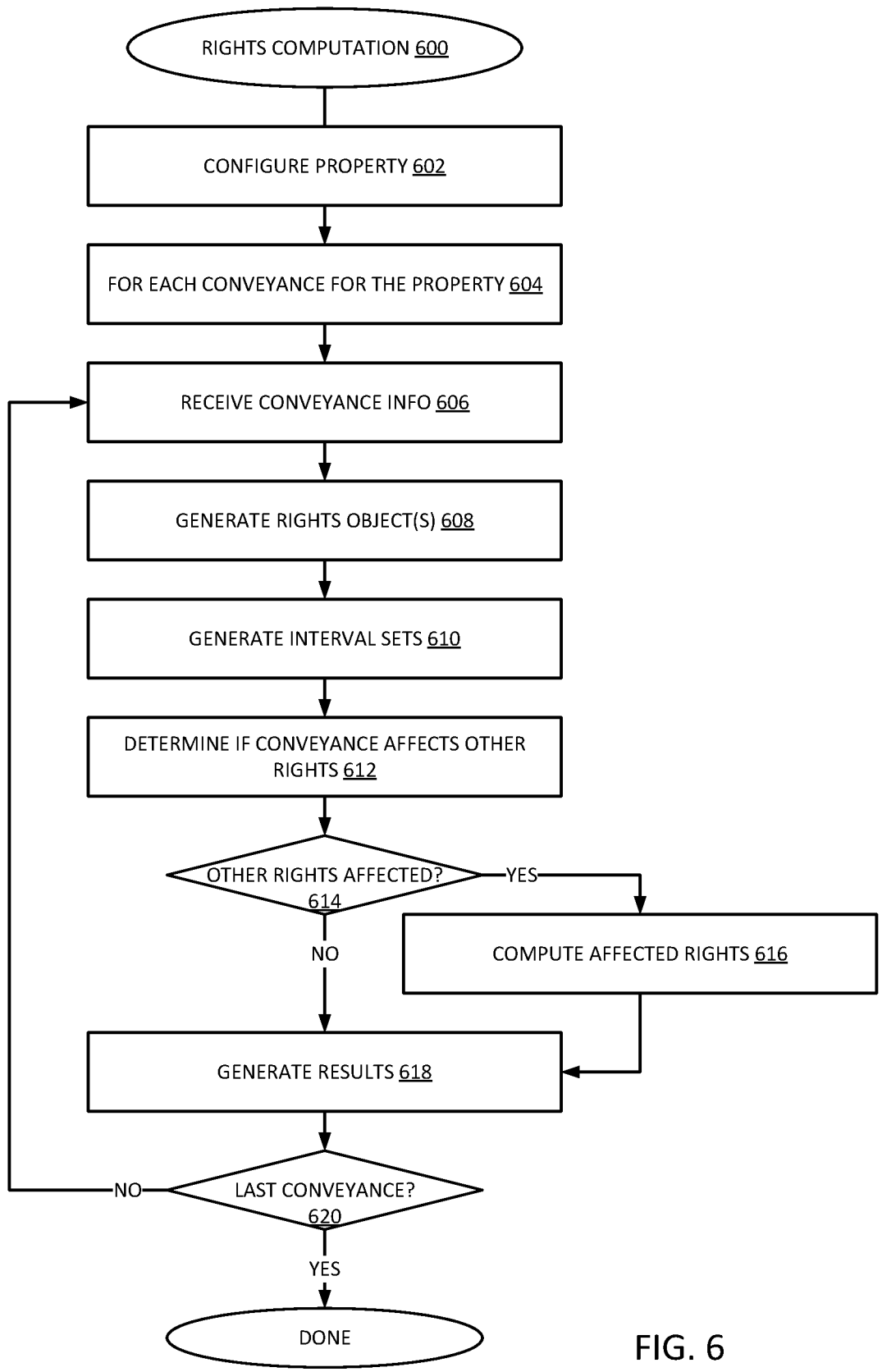
FIG. 6 is an embodiment of a flow diagram of a process for computing land use rights based on conveyance information.

FIG. 6 is an embodiment of a flow diagram of a process for computing land use rights based on conveyance information. One possible process flow 600 for rights computation or ownership computation can occur as follows. In one embodiment, the management system can configure the property such as by receiving input information on names and information about a real property, 602. Such information may also include an original grant of rights, which is typically from a government.

In one embodiment, for each conveyance related to the property, 604, the management system receives conveyance information, 606. For example, the user may input information about the conveyance. As another example, the system can access preloaded information or historical documents or other electronic information. The system generates one or more rights objects related to the conveyance and the parties to the conveyance, 608. The objects can include intervals or bounded spaces. In one embodiment, the objects can include or be organized into interval set information, 610. The management system can organize or manage the intervals/objects with set operations.

In one embodiment, for each conveyance, the management system can determine if the conveyance affects other rights, such as rights owned by other individuals or other rights, or both, related to the rights conveyed, 612. If other rights are affected, 614 YES branch, in one embodiment, the management system can compute the affected rights or generate a relationship to the other rights or a combination, 616. If no other rights are affected, 614 NO branch, or after computing the effect of the conveyance on other rights, in one embodiment, the system generates ownership results indicating rights ownership, 618. If the conveyance evaluated is the last conveyance, 620 YES branch, the computation for the chain of title can finish. If the last conveyance has not been reached, 620 NO branch, the system can continue to process other conveyance information (returning to 606) and continue until all conveyance information is processed.

Figure 7:
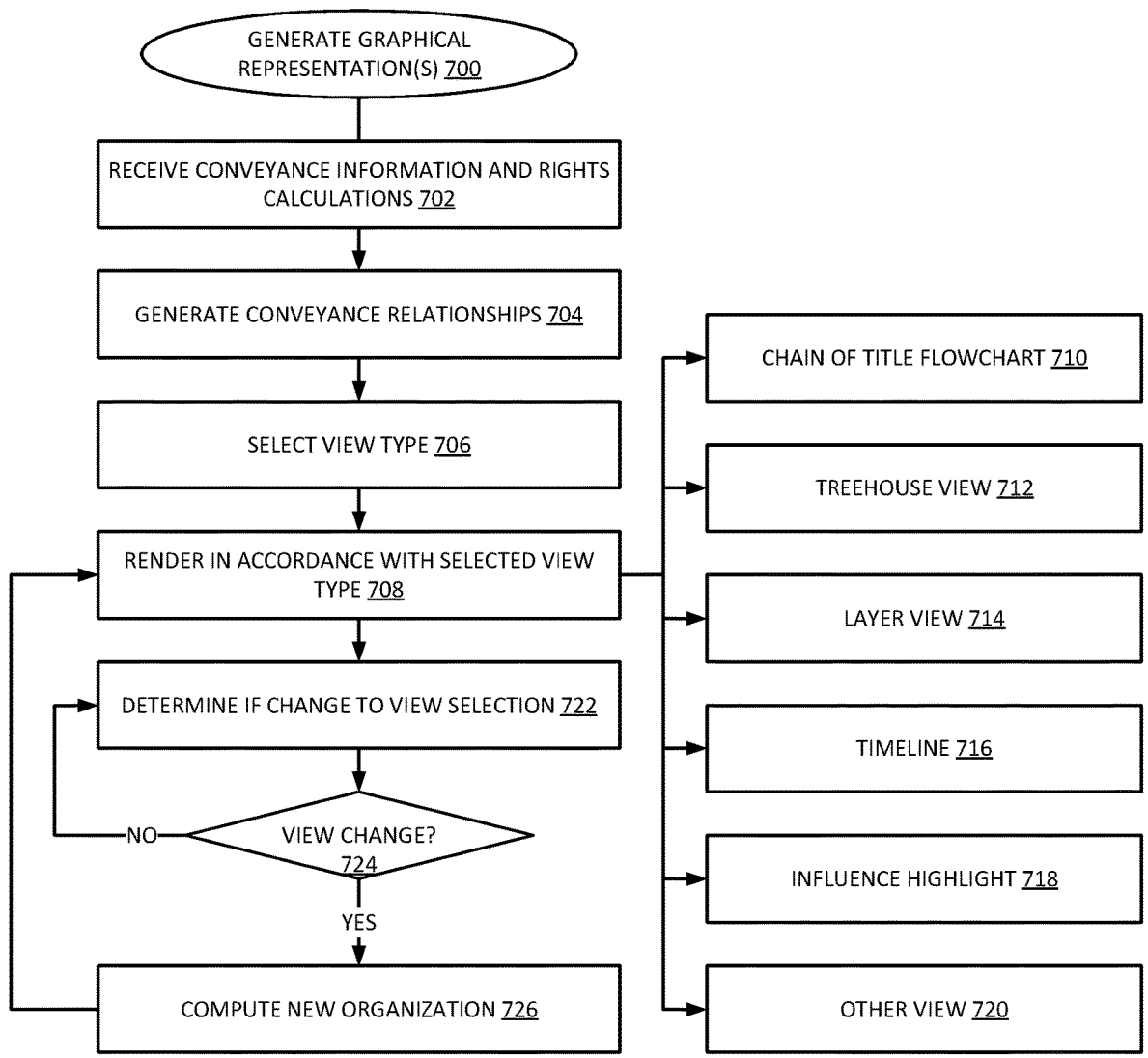
FIG. 7 is an embodiment of a flow diagram of a process for generating a graphical rendering of land use rights information.

FIG. 7 is an embodiment of a flow diagram of a process for generating a graphical rendering of land use rights information. In one embodiment, a management system generates graphical representation(s) of conveyance information. Process 700 represents a flow of operation for generating a graphical representation of conveyance information. In one embodiment, the system receives conveyance information and rights calculations, 702. In one embodiment, the management system includes a computation engine to make the calculations. In one embodiment, the management system includes integrated components that perform computations and generate graphical representations.

In one embodiment, the computation engine or the rendering engine or a combination generates conveyance relationships for the mapped conveyance information, 704. For example, the relationships can indicate how a conveyance document influences or affects rights associated with the conveyance and rights outside the direct conveyance. For example, a conveyance earlier in time will influence conveyances later in time, since a party cannot convey more than they have rights to convey.

In one embodiment, the system selects a view type, 706. The selection can be in response to an interactive request by a user. The system can render the graphical information in accordance with the selected view type, 708. A non-limiting list of view types can include a chain of title flowchart 710, a treehouse view that groups parties with each conveyance information to represent the full effects of the conveyance on rights 712, a layered view including documents and parties 714, a timeline view 716, an influence highlight, 718, or another view 720, or a combination. Timeline view 716 can represent the conveyances based on the timing of the conveyances. Influence highlight 718 can illustrate the effects of a conveyance on other conveyances or parties or both in the chain of title. In one embodiment, the system can support one or more other views 720.

In one embodiment, the system determines if there should be a change to the selected view, 722. For example, a user may interact with the graphical representation and select a change to the view type, or to the data to be viewed. In one embodiment, if there is no view change to be made, 724 NO branch, the system can continue to monitor for view changes, 722. In one embodiment, if there is a view change, 724 YES branch, the system can compute a new organization of the conveyance data for rendering, 726, and render in accordance with the selected view type, 708.

Figure 8A:
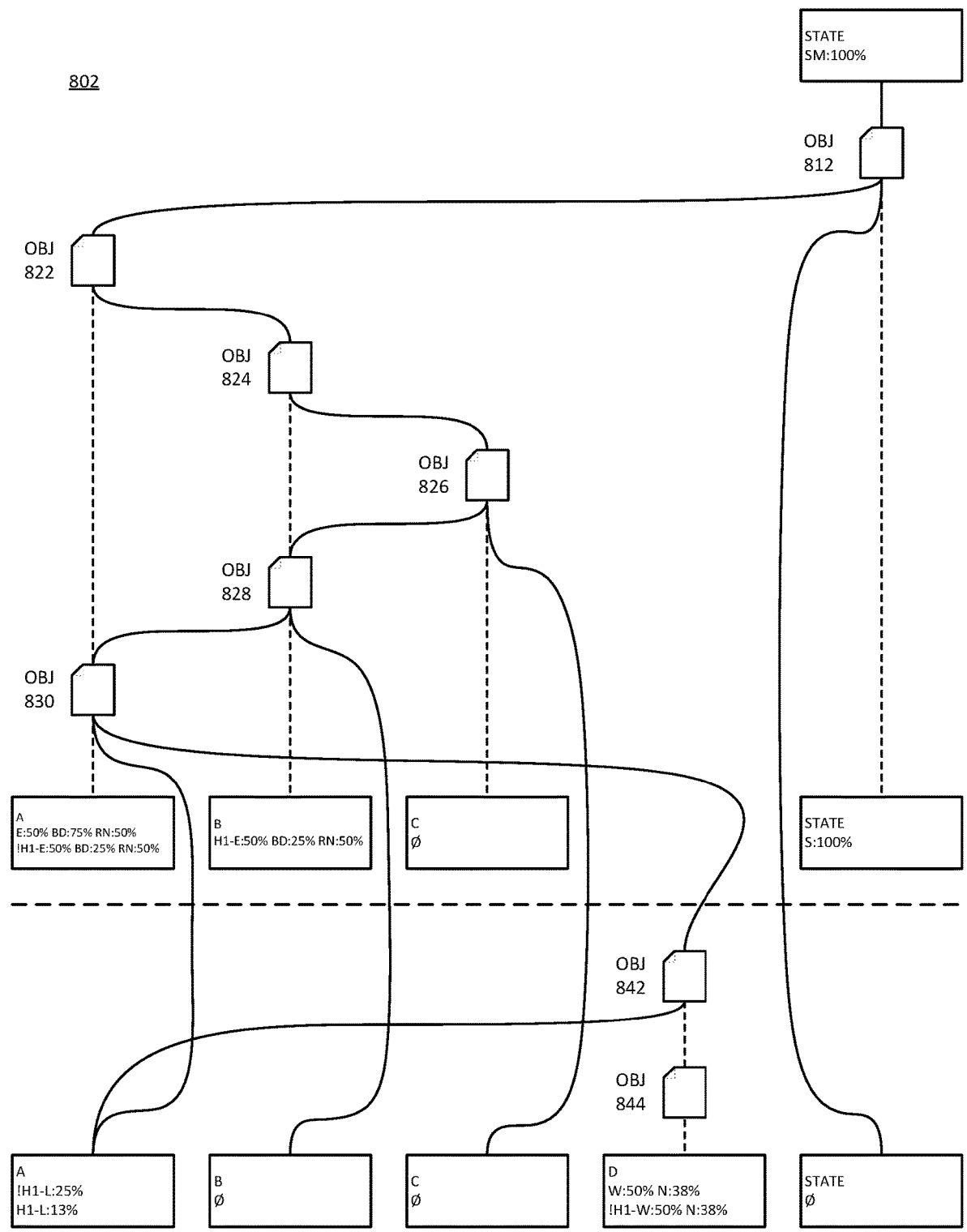
FIG. 8A is a representation of an embodiment of a standard graphical conveyance view.

FIG. 8A is a representation of an embodiment of a standard graphical conveyance view. Diagram 802 represents a standard or compact view of conveyance information, with parties to conveyances represented in boxes illustrating states of ownership, and document objects illustrating the conveyance information, with relationships represented by lines connecting document objects and party ownership states and other documents that come later in time, which directly derive from the document objects.

The parties to the conveyances are represented across the bottom in alphabetical order, but can be grouped in any of a number of different ways. Different groupings could include, but are not limited to: timeline order, order of percentage ownership, order of relationship (e.g., where parties related by conveyance are illustrated next to each other), or some other order.

The State starts as 100% owner of all rights. Object 812 represents a conveyance of mineral rights. The dashed line to State illustrates the connection to the party "State" at the bottom. Object 812 can convey some rights, while others are retained by State. Objects 822, 824, 826, 828, and 830 illustrate other transfers. In the view of diagram 802, the parties to the conveyances and the specifics of the conveyance are not illustrated, but other views can show some or all of such information. The view of diagram 802 simply illustrates the objects that represent conveyances or conveyance instruments, and the resulting or present rights or interests in light of all conveyances.

While the specific percentages shown are not necessarily important, they provide an illustration of the complexities of tracking rights. For example, Executive rights, Mineral rights, Leases, Royalties, Participating and Non-Participating Royalty rights, or other interests, or a combination can all be separately conveyed for separate portions. In one embodiment, diagram 802 illustrates percentage interests, but it can be understood that the percentages are based on tracking and management of actual portions (e.g., via intervals or bounded spaces). Thus, in the simple view of diagram 802, the final percentages may be sufficient for the view, but the actual portions can be tracked by the management system in accordance with any embodiment described herein. It will be understood that each right can be represented as separate bounded spaces, and operated on separately. For related or intersecting rights, the management system can perform computations to compute interests based on different bounded spaces.

In one embodiment, different types of rights can be displayed above and below a dashed line or other separator to illustrate the different interests. As an example, certain interests granted to A in object 822, which are then separated with object 830 can provide interests for D via objects 842 and 844, while maintaining certain rights for A. The other parties (B, C, and State) do not include any of the lower rights and are shown having null sets of interest.

It will be observed that in one embodiment, objects are aligned with parties represented. All parties represented either have a present interest (as of the time of the generation of the view), or had an interest. It will be understood that a "present" interest can be relative. For example, in one embodiment, the management system includes a filter component to select a specific period of time, and represent all transactions and interests starting from a period of time and ending at another selected period of time. Thus, a present interest refers to an interest that occurs within the timeline.

Figure 8B:
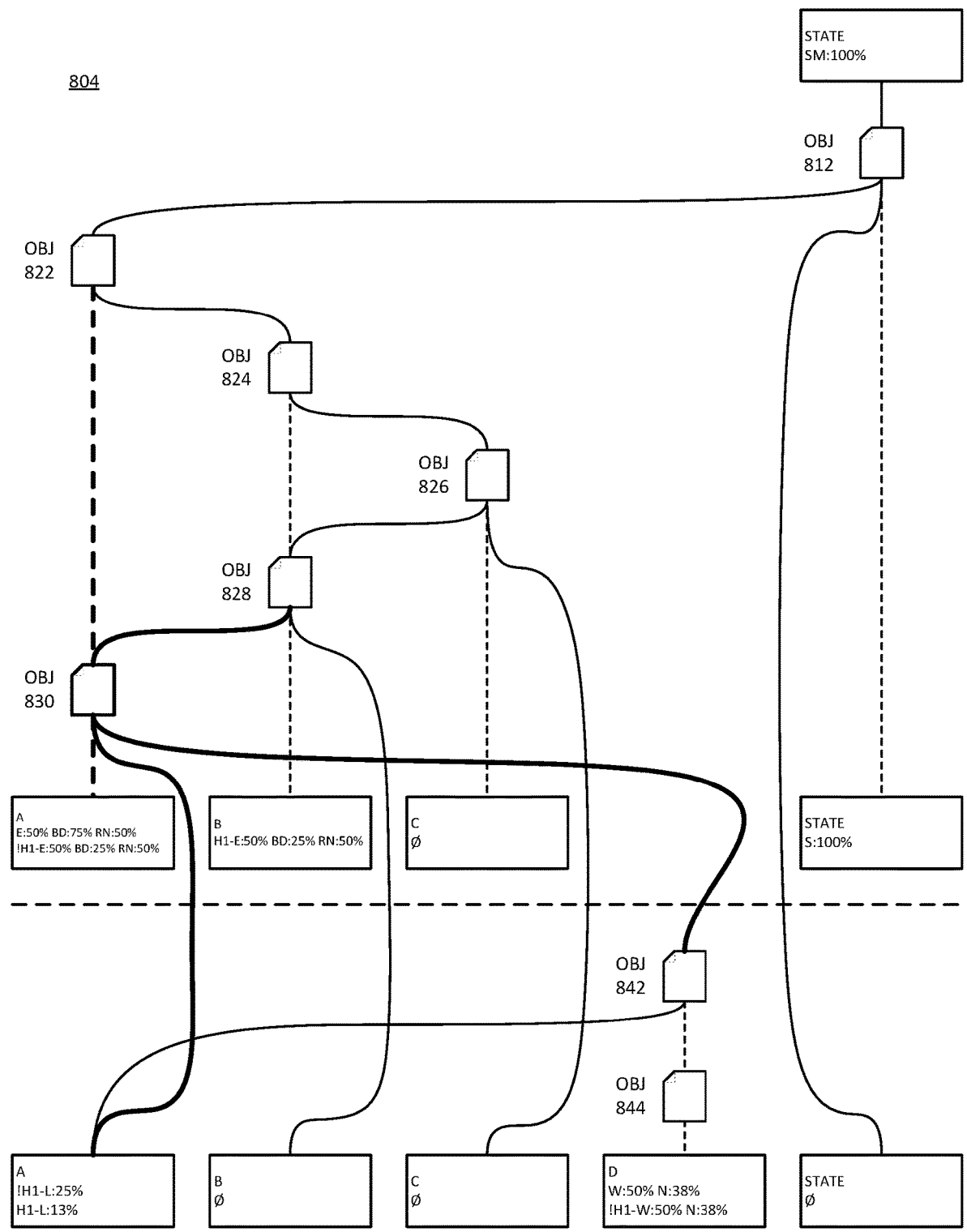
FIG. 8B is a representation of an embodiment of a standard graphical conveyance view showing highlighted relationships.

FIG. 8B is a representation of an embodiment of a standard graphical conveyance view showing highlighted relationships. Diagram 804 provides another illustration of diagram 802, and all the documents and conveyances are considered to be the same. The view of diagram 804 provides additional information through the selection of document object 830 by a user. Selection of object 830 can cause the system to highlight the object representing the conveyance document, and highlight its relationships. The relationships are highlighted from object 830 to other documents and to parties. For example, the system can highlight the source relationship of object 830 to object 822, the source relationship of object 830 to object 828, the child relationship (or resulting interest relationship) in A (of which there are actually two), and the resulting interest relationship from object 830 to object 842. The resulting interest relationship indicates that a conveyance document is the source of rights that a party possesses that permits either a continuing interest or the ability to convey an interest to another party. In one embodiment, a user can select further information to identify more details about the conveyances and resulting ownership rights.

Figure 9A:
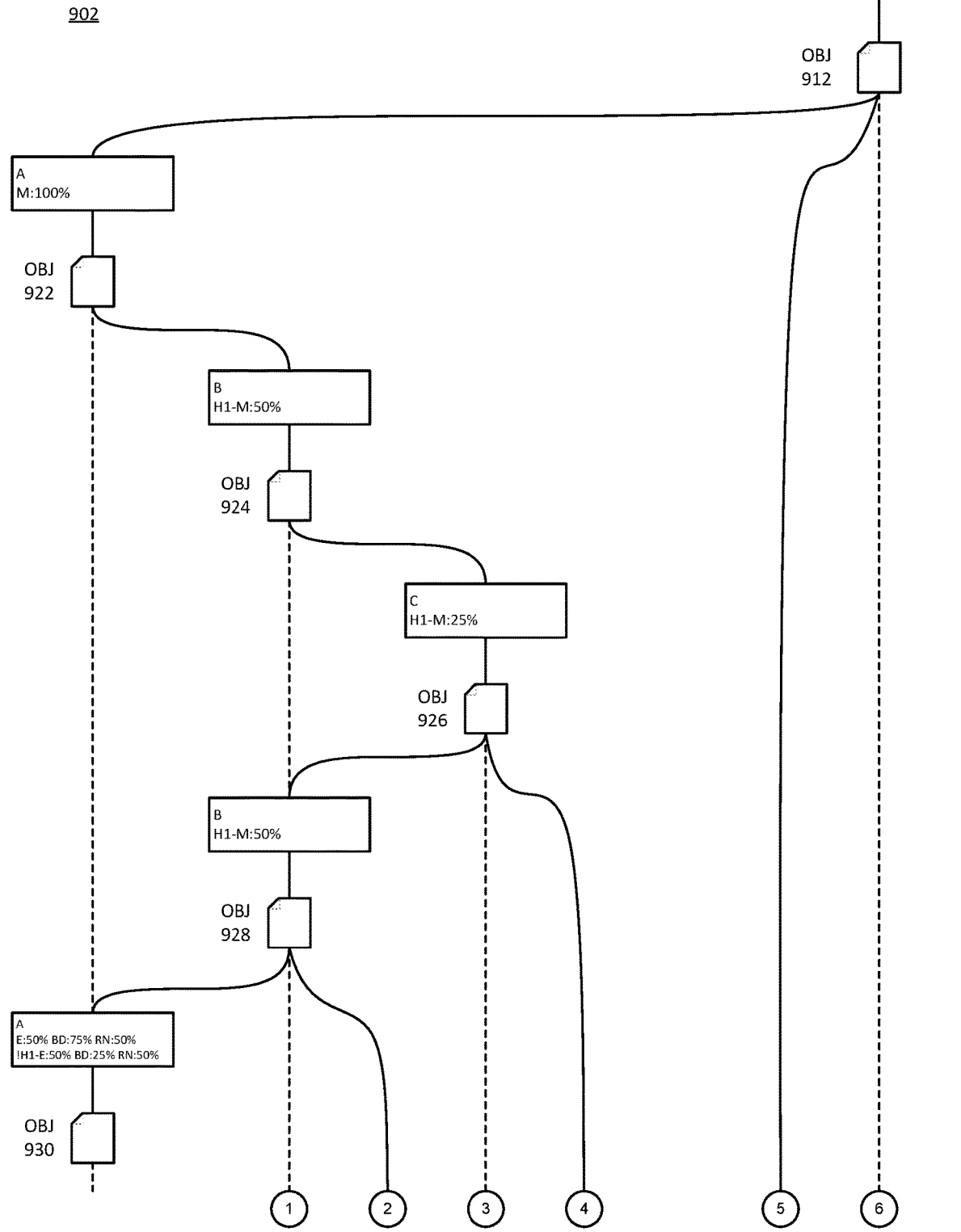
FIGS. 9A-9B illustrate a representation of an embodiment of a graphical layered view.
Figure 9B:
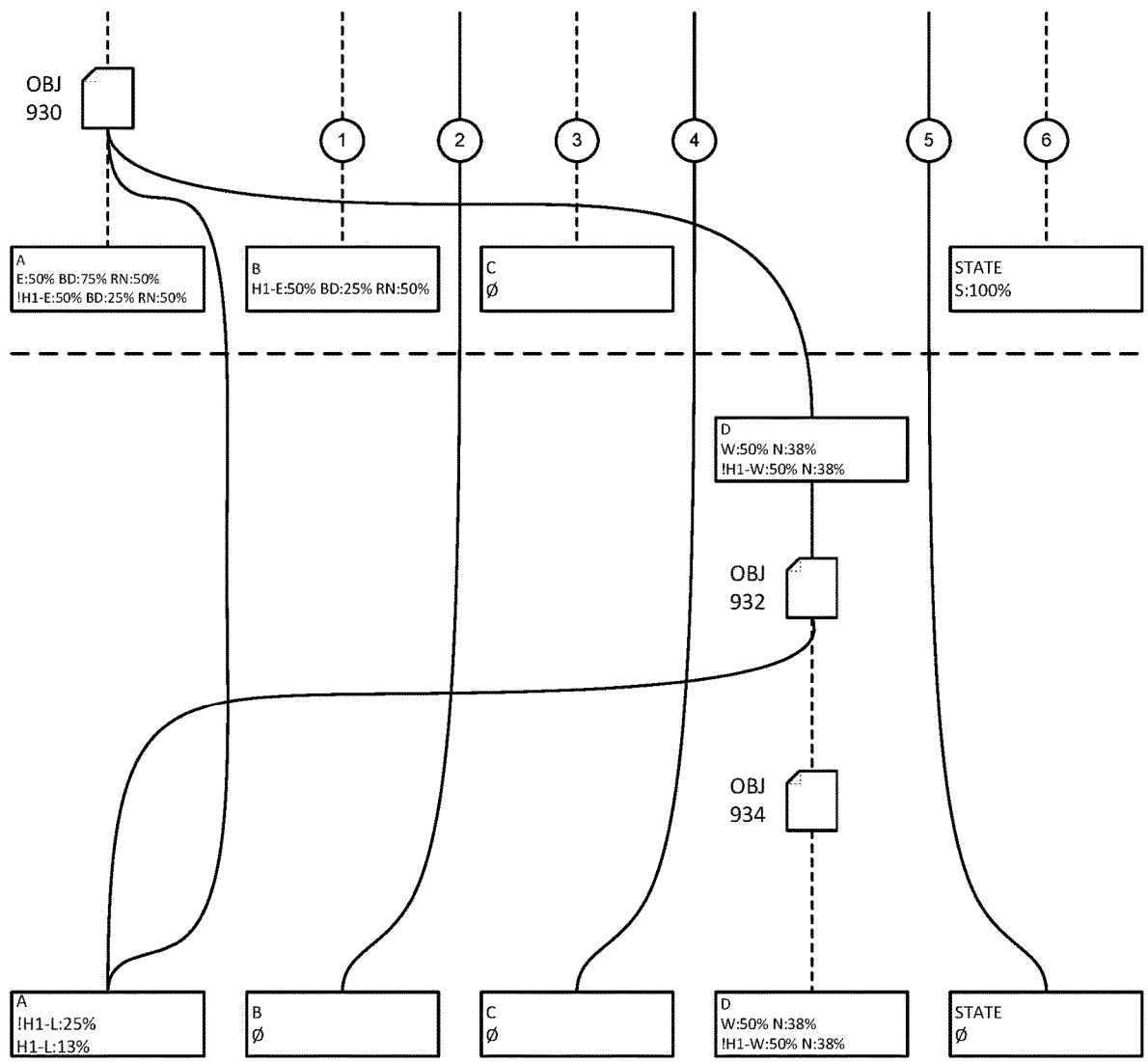

FIGS. 9A-9B illustrate a representation of an embodiment of a graphical layered view. The layered view of diagrams 902 and 904 represent the same information as illustrated in diagrams 802 and 804. The use of the same information is for purposes of illustration as to how the different views can be structured, and is not limiting in any way. In a layered view, the parties and their resulting ownership rights are layered between the conveyance documents. Thus, diagrams 902 and 904 include other objects to illustrate states of ownership.

Thus, State conveys rights to A via object 912, and A has a present interest at that moment of 100% mineral rights. With object 922, A conveys rights to B, as illustrated. Diagram 902 also illustrates the conveyance and resulting rights from object 924, object 926, and object 928. With the layered view, a user has more detail to trace information through the chain of title, instead of simple the final state of interests. The conveyance by object 930 continues into diagram 904 of FIG. 9B. Similar to the above diagrams, diagram 904 illustrates the final interests of the various parties. Object 930 grants rights to D, which are split with object 932 between A and D, and the conveyance of object 934 affirms the rights to D.

It will be observed that the diagrams illustrate certain rights prefixed by an exclamation operation (!), for example, !H1-L:25% for A in diagram 904. The ! operator can be understood as indicating all interest except for what is designated. Thus, A has interest in everything except H1-L: 25%. Other conventions could be used.

Figure 10:
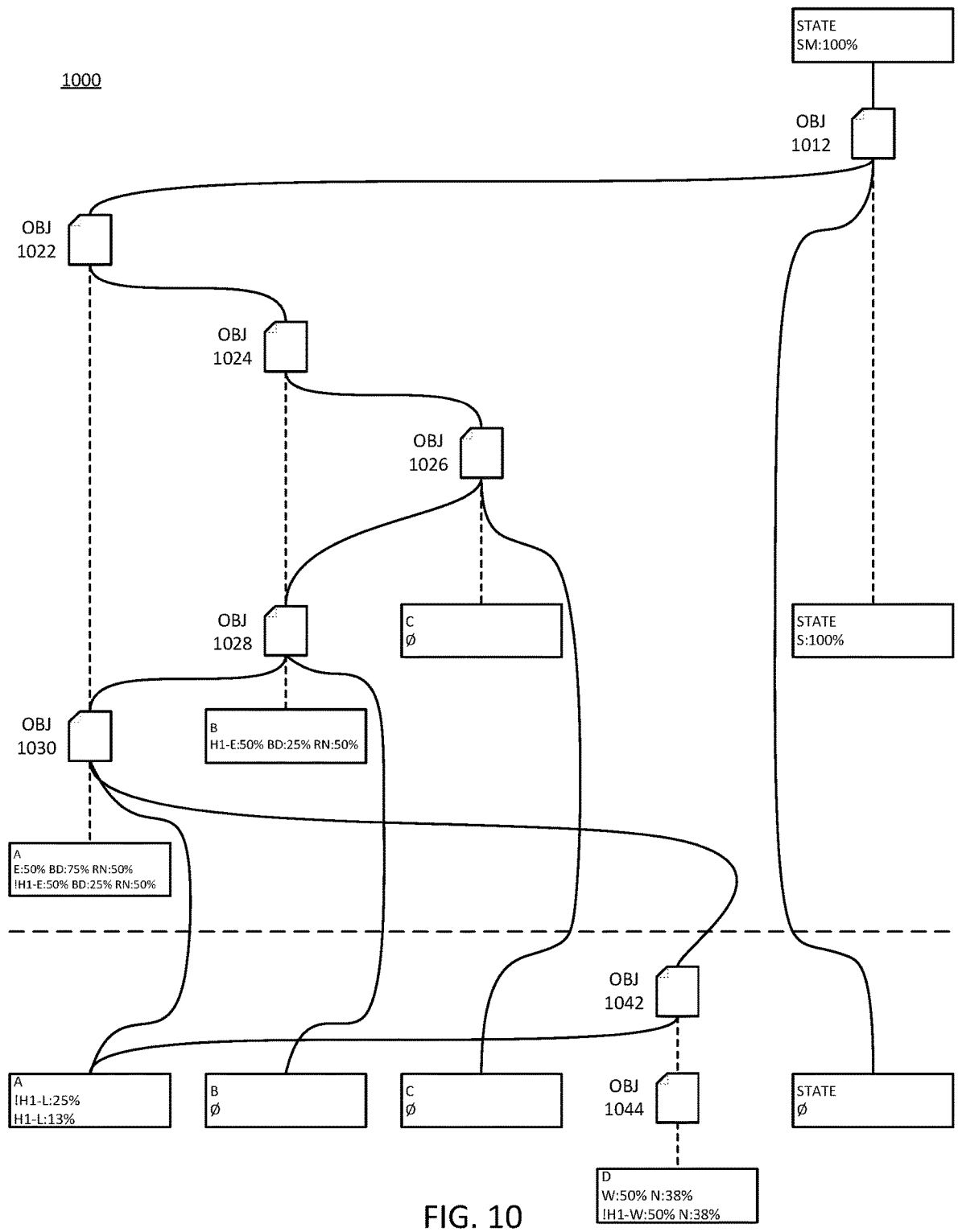
FIG. 10 is a representation of an embodiment of a graphical conveyance view illustrating the timing of conveyances.

FIG. 10 is a representation of an embodiment of a graphical conveyance view illustrating the timing of conveyances. As with diagrams 902 and 904, diagram 1000 represents the same information as provided in the standard view of diagram 802, but with timing information.

The timing of conveyances can change the location of where parties are illustrated. With more complex rights and conveyance situations, there can be more variation in the timing of when parties received their rights, and would look different than what is illustrated in diagram 1000. It will be observed that with timing information, diagram 1000 illustrates objects 1012, 1022, 1024, 1026, 1028, 1030, 1042, and 1044 in the same relative locations as provided in diagram 802. However, now the interest objects are shown in different relative locations consistent with the alignment of when the interests were passed. Thus, the interests of State and C can be determined after object 1026, and remain set at that point. The interest of B occurs later, after object 1028. The interest of A occurs after object 1030. On the lower portion of the diagram, the interests of State, A, B, and C are known after object 1042. The interests of D are known after object 1044.

FIG. 11 is a representation of an embodiment of a graphical ownership report. In the ownership report, all ownership rights are illustrated. In one embodiment, the system can display ownership view 1100 in response to an interaction with a user, such as a mouse "hover," or a click or other selection. On the left, the negative interests can be seen, which indicates that all rights are owned except what are shown. On the right are positive ownership interests, which displays affirmative interests. Ownership view 1100 can include "navigation" elements, such as selectable items to refresh the view, export the information, or close or exit the view.

In one embodiment, the management system displays ownership view 1100 as an overlay over a different view, such as a popup window or popup view. In one embodiment, ownership view 1100 is displayed as a separate view. While percentage information is illustrated in ownership view 1100, in one embodiment, specific ownership ranges could be illustrated. In one embodiment, ownership view 1100 can illustrate specific ownership segments, referring to specific plot information indicated by conversion of bounded space information to physical plot information.

FIG. 12 is a representation of an embodiment of a graphical runsheet report. The runsheet report indicates when conveyances occurred. In one embodiment, the system can display runsheet view 1200 in response to an interaction with a user, such as a mouse "hover," or a click or other selection. Runsheet view 1200 can include "navigation" elements, such as selectable items to refresh the view, export the information as a spreadsheet or export one or more files of the information, or close or exit the view.

In one embodiment, the management system displays runsheet view 1200 as an overlay over a different view, such as a popup window or popup view. In one embodiment, runsheet view 1200 is displayed as a separate view. Runsheet 1200 illustrates the information of conveyances by type of instrument, parties affected by the instrument, and the date. It will be understood that multiple Grantees can be listed together. It will be understood that the management system can generate a separate runsheet for the same plot of land for different rights.

FIG. 13 is a representation of an embodiment of pseudocode for a conveyance management engine. Pseudocode 1300 provides one simple example of functional code operations for creating an object, including computing rights interests as properties for the object. The management system can be said to include and execute the code. In practice a piece of computer hardware executes the operations. The simplified example of pseudocode 1300 is to be understood as illustrative, but not limiting. Other functions can be included. The functions illustrated can be executed by different function calls. There is no limitation on the order of the operations of the lines of code, except that lines dependent on other functions or information will occur after such information is obtained or function is performed.

At line 1302, the function is opened for creating an object. In one embodiment, some or all of the object creation functions can be callable. In one embodiment, object creation functions can be called in response to a conveyance document or conveyance object, and the system will compute new or modified interests in light of the conveyance. In one embodiment, one or more elements or conditions are included as input to create the object. At line 1304, the code identifies the names associated with the object. For a conveyance object, the names will include the conveying and receiving parties. For an ownership state object, the name will be the name of the party whose ownership interest is being computed.

At line 1306, the code can identify the property the object applies to. At line 1308, the code can identify the property rights or interests of the identified parties (i.e., names). It will be understood that one or multiple rights or interests could be implicated. For an ownership node object, the rights can be conveyed through multiple different documents, or a combination of a document and a previous state of ownership rights for the same party. For a conveyance document object, the document can convey multiple different types of rights.

At line 1310, the code generates the rights sets as ranges or intervals. The ranges refer to the bounded spaces referenced throughout. Each right can be separately identified as a bounded range or series of ranges. At line 1312, the code can perform set operations to define the object rights. For example, the code can take rights from a previous rights state and combine them (either additively or subtractively, depending on the object type and the position of the party) with the modification or new rights of the instant conveyance.

At line 1314, the code can generate a new instance of the object type with the defined rights that are computed. In one embodiment, the code uses an object class as a starting point for object creation. In one embodiment, the code uses another object instance as a starting point for object creation.

The created object can inherit the properties of the parent object, subject to the modifications of the conveyance. In one embodiment, at line 1316, the code creates or generates chain of title relationships. Such chain of title relationships can be represented as pointers or calls or handles or other mechanism to another object managed by the management system. Thus, the management system can trace objects in a structured view, such as those illustrated above, to represent the chain of title. At line 1318, the code ends the create object functions.

FIG. 14 is a representation of an embodiment of pseudocode for a display of a conveyance management engine. Pseudocode 1400 provides one simple example of functional code operations for displaying an object, including rights interests managed as bounded space. The management system can be said to include and execute the code. In practice a piece of computer hardware executes the operations. The simplified example of pseudocode 1400 is to be understood as illustrative, but not limiting. Other functions can be included. The functions illustrated can be executed by different function calls. There is no limitation on the order of the operations of the lines of code, except that lines dependent on other functions or information will occur after such information is obtained or function is performed.

At line 1402, the function is opened for displaying an object. In one embodiment, some or all of the object displaying functions can be callable. In one embodiment, object display functions can be called in response to interaction of a user with a graphical display, or creation of an object, or a combination. In one embodiment, the system will compute new or modified interests in light of a conveyance, and update a graphical representation in realtime. In one embodiment, one or more elements or conditions are included as input to create the object. At line 1404, the code generates an object GUI (graphical user interface) for the object type to be displayed. For example, object types can include conveyance document objects, rights states objects which illustrate an instance of a party's interests, or other objects, such as display objects or containers.

At line 1406, the code can identify relationships for the object such as source relationships. For highlighting display changes, the relationships can also include child relationships. At line 1408, the code can identify source and child objects. It will be understood that as represented in lines 1406 and 1408, the relationships refer to relationships to states of interest, and the source and child objects refer to sources of rights and conveyances of rights. The terminology here is simply for purposes of illustration, and is not limiting. The operation of lines 1406 and 1408 are to identify a present state of interest, and sources and grants of interests that might affect the present state of interest.

At line 1410, the code can compute the rights sets as ranges or intervals. The ranges refer to the bounded spaces referenced throughout. Each right can be separately identified as a bounded range or series of ranges. At line 1412, the code can generate graphical elements to illustrate the chain of title, such as lines or curves to connect an object to another object, which was identified in lines 1406 or 1408 or a combination. In one embodiment, in line 1414, if the management system detects an interaction with a graphical representation, it can call the functions of the display object to perform operations in response to the interaction. In one embodiment, the operations in response to the operation results in calling the display object functions to display a different type of view. In one embodiment, as illustrated at line 1416, the code can highlight relationships in response to selections by a user. In one embodiment, the display object function can render a display with more detailed information. At line 1418, the interaction function ends. At line 1420, the display object functions end.

Figure 15:
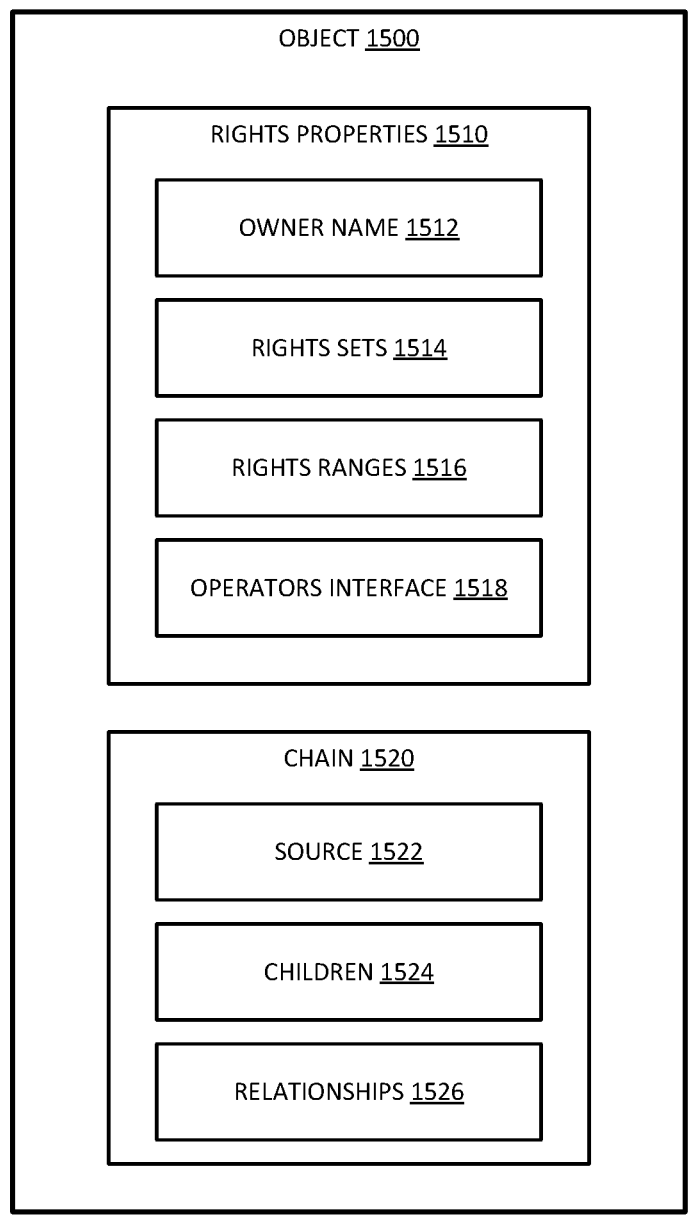
FIG. 15 is a block of an embodiment of a conveyance object with weighted rights management.

FIG. 15 is a block of an embodiment of a conveyance object with weighted rights management. Object 1500 represents an example of an object in accordance with embodiments of objects described throughout. Object 1500 is intended to illustrate a simplified view of structured data used to manage land use rights information. Other properties and functions can be included. Not every object instance will include all functions or data. Object 1500 generically represents an object, and different types of objects can be implemented in a management system.

In one embodiment, object 1500 includes rights properties 1510. The rights properties define the interests of a party. In one embodiment, right properties 1510 includes an owner name or an identification of a party 1512. Owner name 1512 represents an ownership. Instance of object 1500 that represent conveyances can include multiple instances of rights properties 1510, such as to represent all parties of the conveyance.

In one embodiment, rights properties 1510 includes rights sets 1514, which identify what interests are owned by owner name 1512. Rights properties 1510 include rights ranges 1516, which represent bounded space or intervals. Rights ranges 1516 provides a specific representation for the management system of how much and what specific rights are owned. Rights are operable by the management system via operators interface 1518, which represents that rights properties 1510 includes ranges that can be computed by set operators to compute new rights that preserve the quantity and portion information through the intervals. Thus, set operators can modify one or more intervals based on a type of interaction with a different set of one or more intervals.

In one embodiment, object 1500 includes chain information 1520. Chain information 1520 represents data, functions, interfaces, or a combination that enables the management system to associate object 1500 with other objects in chain of title relationships. The chain of title relationships will be understood to be within the context of the management system. Thus, there is no requirement that every relationship be exactly traceable to a specific real property document. For example, relationships between conveyance document objects and interest node objects (or objects representing the state of ownership), are derived by the management system, to represent the results of the documents. In the physical world, only the documents themselves exist, and the management system generates the relationships and interest node objects to represent information to a user as a summary or understanding of the results of the real world documents.

In one embodiment, chain information 1520 can include source 1522, which represents a source of rights. Source 1522 refers to one or more objects that represent the source of rights set out in rights properties 1510. In one embodiment, chain information 1520 can include children 1524, which represents rights conveyed to other parties. Children 1524 refers to one or more other objects that represent the receipt of rights conveyed from a party identified by rights properties 1510. In one embodiment, chain information 1520 includes relationships 1526, which can include all relationships or interactions with other objects that are not specifically source 1522 or children 1524. Such relationships can include placeholders, positioning, timing information, or any other relationship.

Figure 16:
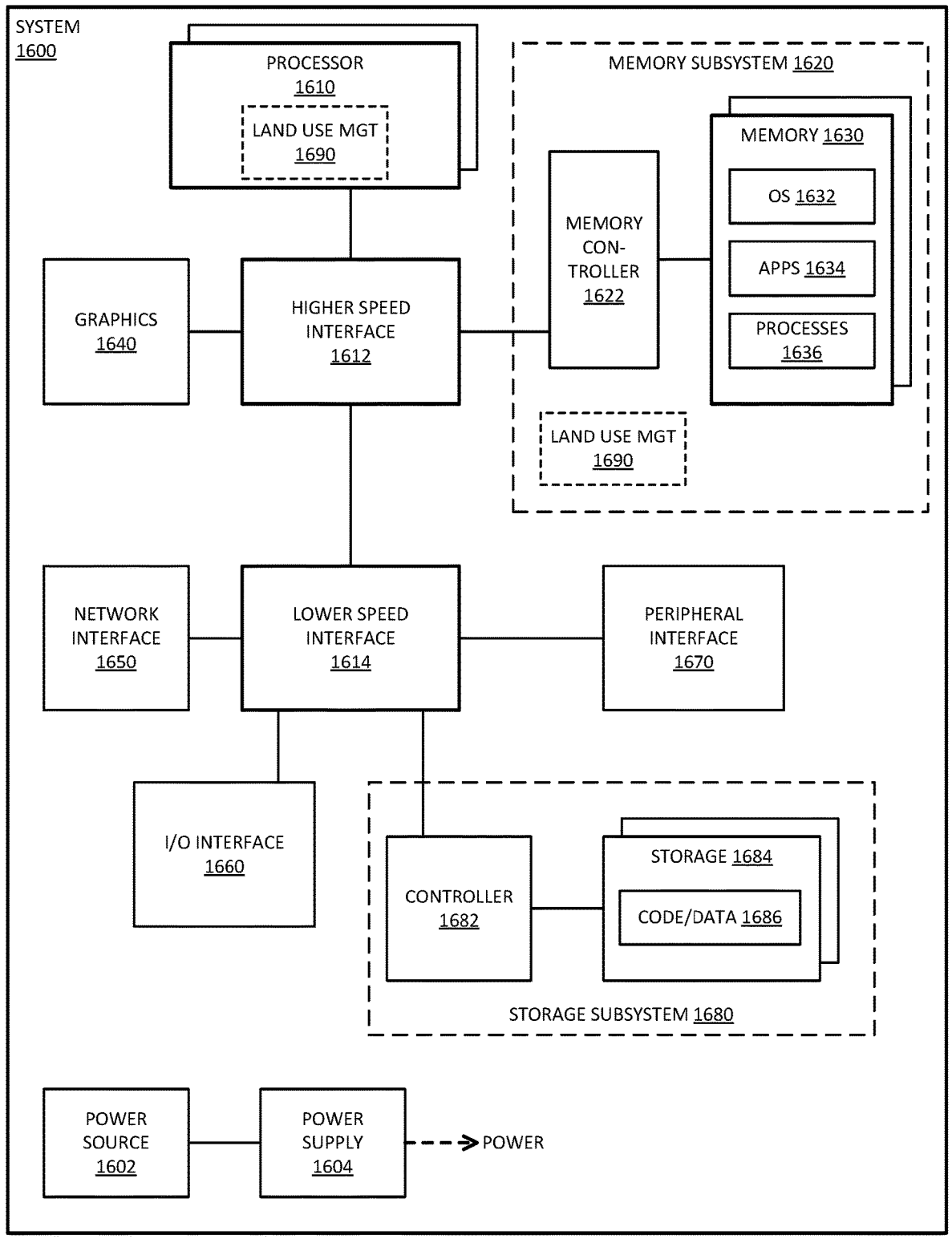
FIG. 16 is a block diagram of an embodiment of a computing system in which real property rights management can be implemented.

FIG. 16 is a block diagram of an embodiment of a computing system in which real property rights management can be implemented. System 1600 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 1600 includes processor 1610, which provides processing, operation management, and execution of instructions for system 1600. Processor 1610 can include any type of microprocessor, central processing unit (CPU), graphics processing unit (GPU), processing core, or other processing hardware to provide processing for system 1600, or a combination of processors. Processor 1610 controls the overall operation of system 1600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 1600 includes interface 1612 coupled to processor 1610, which can represent a higher speed interface or a high throughput interface for system components that needs higher bandwidth connections, such as memory subsystem 1620 or graphics interface components 1640. Interface 1612 can represent a "north bridge" circuit, which can be a standalone component or integrated onto a processor die. Where present, graphics interface 1640 interfaces to graphics components for providing a visual display to a user of system 1600. In one embodiment, graphics interface 1640 can drive a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, the display can include a touchscreen display. In one embodiment, graphics interface 1640 generates a display based on data stored in memory 1630 or based on operations executed by processor 1610 or both. In one embodiment, graphics interface 1640 generates a display based on data stored in memory 1630 or based on operations executed by processor 1610 or both.

Memory subsystem 1620 represents the main memory of system 1600, and provides storage for code to be executed by processor 1610, or data values to be used in executing a routine. Memory subsystem 1620 can include one or more memory devices 1630 such as read-only memory (ROM), flash memory, one or more varieties of random access memory (RAM) such as DRAM (dynamic RAM), or other memory devices, or a combination of such devices. Memory 1630 stores and hosts, among other things, operating system (OS) 1632 to provide a software platform for execution of instructions in system 1600. Additionally, applications 1634 can execute on the software platform of OS 1632 from memory 1630. Applications 1634 represent programs that have their own operational logic to perform execution of one or more functions. Processes 1636 represent agents or routines that provide auxiliary functions to OS 1632 or one or more applications 1634 or a combination. OS 1632, applications 1634, and processes 1636 provide software logic to provide functions for system 1600. In one embodiment, memory subsystem 1620 includes memory controller 1622, which is a memory controller to generate and issue commands to memory 1630. It will be understood that memory controller 1622 could be a physical part of processor 1610 or a physical part of interface 1612. For example, memory controller 1622 can be an integrated memory controller, integrated onto a circuit with processor 1610.

While not specifically illustrated, it will be understood that system 1600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 1600 includes interface 1614, which can be coupled to interface 1612. Interface 1614 can be a lower speed interface than interface 1612. In one embodiment, interface 1614 can be a "south bridge" circuit, which can include standalone components and integrated circuitry. In one embodiment, multiple user interface components or peripheral components, or both, couple to interface 1614. Network interface 1650 provides system 1600 the ability to communicate with remote devices (e.g., servers or other computing devices) over one or more networks. Network interface 1650 can include an Ethernet adapter, wireless interconnection components, cellular network interconnection components, USB (universal serial bus), or other wired or wireless standards-based or proprietary interfaces. Network interface 1650 can exchange data with a remote device, which can include sending data stored in memory or receiving data to be stored in memory.

In one embodiment, system 1600 includes one or more input/output (I/O) interface(s) 1660. I/O interface 1660 can include one or more interface components through which a user interacts with system 1600 (e.g., audio, alphanumeric, tactile/touch, or other interfacing). Peripheral interface 1670 can include any hardware interface not specifically mentioned above. Peripherals refer generally to devices that connect dependently to system 1600. A dependent connection is one where system 1600 provides the software platform or hardware platform or both on which operation executes, and with which a user interacts.

In one embodiment, system 1600 includes storage subsystem 1680 to store data in a nonvolatile manner. In one embodiment, in certain system implementations, at least certain components of storage 1680 can overlap with components of memory subsystem 1620. Storage subsystem 1680 includes storage device(s) 1684, which can be or include any conventional medium for storing large amounts of data in a nonvolatile manner, such as one or more magnetic, solid state, or optical based disks, or a combination. Storage 1684 holds code or instructions and data 1686 in a persistent state (i.e., the value is retained despite interruption of power to system 1600). Storage 1684 can be generically considered to be a "memory," although memory 1630 is typically the executing or operating memory to provide instructions to processor 1610. Whereas storage 1684 is nonvolatile, memory 1630 can include volatile memory (i.e., the value or state of the data is indeterminate if power is interrupted to system 1600). In one embodiment, storage subsystem 1680 includes controller 1682 to interface with storage 1684. In one embodiment controller 1682 is a physical part of interface 1614 or processor 1610, or can include circuits or logic in both processor 1610 and interface 1614.

Power source 1602 provides power to the components of system 1600. More specifically, power source 1602 typically interfaces to one or multiple power supplies 1604 in system 1602 to provide power to the components of system 1600. In one embodiment, power supply 1604 includes an AC to DC (alternating current to direct current) adapter to plug into a wall outlet. Such AC power can be renewable energy (e.g., solar power) power source 1602. In one embodiment, power source 1602 includes a DC power source, such as an external AC to DC converter. In one embodiment, power source 1602 or power supply 1604 includes wireless charging hardware to charge via proximity to a charging field. In one embodiment, power source 1602 can include an internal battery or fuel cell source.

In one embodiment, system 1600 includes elements of a land use management or manager 1690 (alternately referred to as management system 1690) in accordance with any embodiment described throughout. In one embodiment, system 1600 represents a computing device that executes management system 1690. In one embodiment, system 1600 represents a computing device through which a user accesses a server that execute the management system. Management system 1690 exists within system 1600 as components for execution. As illustrated, code, data, and objects can be stored within memory subsystem 1620 for execution. Processor 1610 executes the code and objects, and uses the data to perform the functions of the management system. Thus, components of management system 1690 within system 1600 configure the hardware components of system 1600 to provide the functions described in embodiments of a management system described throughout. It will be understood that either as a server or as an accessing device, system 1600 can access the other side of the operation (i.e., either the client side or the server side) via network interface 1650. In one embodiment, system 1600 stores one or more components for execution of land use management 1690.

Figure 17:
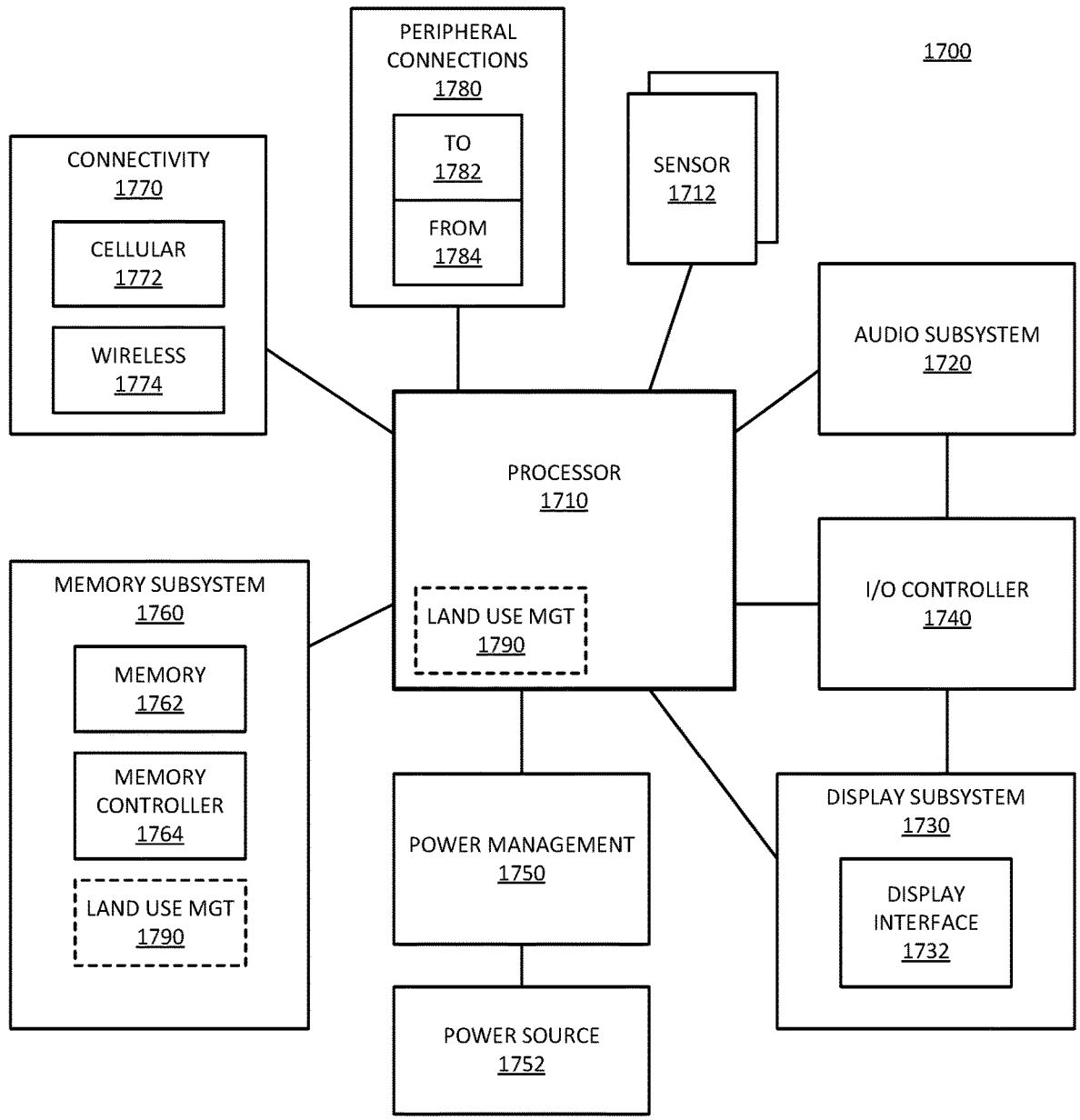
FIG. 17 is a block diagram of an embodiment of a mobile device in which real property rights management can be implemented.

FIG. 17 is a block diagram of an embodiment of a mobile device in which real property rights management can be implemented. Device 1700 represents a mobile computing device, such as a computing tablet, a mobile phone or smartphone, a wireless-enabled e-reader, wearable computing device, an internet-of-things device or other mobile device, or an embedded computing device. It will be understood that certain of the components are shown generally, and not all components of such a device are shown in device 1700.

Device 1700 includes processor 1710, which performs the primary processing operations of device 1700. Processor 1710 can include one or more physical devices, such as microprocessors, application processors, microcontrollers, programmable logic devices, or other processing means. The processing operations performed by processor 1710 include the execution of an operating platform or operating system on which applications and device functions are executed. The processing operations include operations related to I/O (input/output) with a human user or with other devices, operations related to power management, operations related to connecting device 1700 to another device, or a combination. The processing operations can also include operations related to audio I/O, display I/O, or other interfacing, or a combination. Processor 1710 can execute data stored in memory. Processor 1710 can write or edit data stored in memory.

In one embodiment, system 1700 includes one or more sensors 1712. Sensors 1712 represent embedded sensors or interfaces to external sensors, or a combination. Sensors 1712 enable system 1700 to monitor or detect one or more conditions of an environment or a device in which system 1700 is implemented: Sensors 1712 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 1712 can also include sensors for biometric systems such as fingerprint recognition systems, face detection or recognition systems, or other systems that detect or recognize user features. Sensors 1712 should be understood broadly, and not limiting on the many different types of sensors that could be implemented with system 1700. In one embodiment, one or more sensors 1712 couples to processor 1710 via a frontend circuit integrated with processor 1710. In one embodiment, one or more sensors 1712 couples to processor 1710 via another component of system 1700.

In one embodiment, device 1700 includes audio subsystem 1720, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 1700, or connected to device 1700. In one embodiment, a user interacts with device 1700 by providing audio commands that are received and processed by processor 1710.

Display subsystem 1730 represents hardware (e.g., display devices) and software components (e.g., drivers) that provide a visual display for presentation to a user. In one embodiment, the display includes tactile components or touchscreen elements for a user to interact with the computing device. Display subsystem 1730 includes display interface 1732, which includes the particular screen or hardware device used to provide a display to a user. In one embodiment, display interface 1732 includes logic separate from processor 1710 (such as a graphics processor) to perform at least some processing related to the display. In one embodiment, display subsystem 1730 includes a touchscreen device that provides both output and input to a user. In one embodiment, display subsystem 1730 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others. In one embodiment, display subsystem includes a touchscreen display. In one embodiment, display subsystem 1730 generates display information based on data stored in memory or based on operations executed by processor 1710 or both.

I/O controller 1740 represents hardware devices and software components related to interaction with a user. I/O controller 1740 can operate to manage hardware that is part of audio subsystem 1720, or display subsystem 1730, or both. Additionally, I/O controller 1740 illustrates a connection point for additional devices that connect to device 1700 through which a user might interact with the system. For example, devices that can be attached to device 1700 might include microphone devices, speaker or stereo systems, video systems or other display device, keyboard or keypad devices, or other I/O devices for use with specific applications such as card readers or other devices.

As mentioned above, I/O controller 1740 can interact with audio subsystem 1720 or display subsystem 1730 or both. For example, input through a microphone or other audio device can provide input or commands for one or more applications or functions of device 1700. Additionally, audio output can be provided instead of or in addition to display output. In another example, if display subsystem includes a touchscreen, the display device also acts as an input device, which can be at least partially managed by I/O controller 1740. There can also be additional buttons or switches on device 1700 to provide I/O functions managed by I/O controller 1740.

In one embodiment, I/O controller 1740 manages devices such as accelerometers, cameras, light sensors or other environmental sensors, gyroscopes, global positioning system (GPS), or other hardware that can be included in device 1700, or sensors 1712. The input can be part of direct user interaction, as well as providing environmental input to the system to influence its operations (such as filtering for noise, adjusting displays for brightness detection, applying a flash for a camera, or other features).

In one embodiment, device 1700 includes power management 1750 that manages battery power usage, charging of the battery, and features related to power saving operation. Power management 1750 manages power from power source 1752, which provides power to the components of system 1700. In one embodiment, power source 1752 includes an AC to DC (alternating current to direct current) adapter to plug into a wall outlet. Such AC power can be renewable energy (e.g., solar power, motion based power). In one embodiment, power source 1752 includes only DC power, which can be provided by a DC power source, such as an external AC to DC converter. In one embodiment, power source 1752 includes wireless charging hardware to charge via proximity to a charging field. In one embodiment, power source 1752 can include an internal battery or fuel cell source.

Memory subsystem 1760 includes memory device(s) 1762 for storing information in device 1700. Memory subsystem 1760 can include nonvolatile (state does not change if power to the memory device is interrupted) or volatile (state is indeterminate if power to the memory device is interrupted) memory devices, or a combination. Memory 1760 can store application data, user data, music, photos, documents, or other data, as well as system data (whether long-term or temporary) related to the execution of the applications and functions of system 1700. In one embodiment, memory subsystem 1760 includes memory controller 1764 (which could also be considered part of the control of system 1700, and could potentially be considered part of processor 1710). Memory controller 1764 includes a scheduler to generate and issue commands to control access to memory device 1762.

Connectivity 1770 includes hardware devices (e.g., wireless or wired connectors and communication hardware, or a combination of wired and wireless hardware) and software components (e.g., drivers, protocol stacks) to enable device 1700 to communicate with external devices. The external device could be separate devices, such as other computing devices, wireless access points or base stations, as well as peripherals such as headsets, printers, or other devices. In one embodiment, system 1700 exchanges data with an external device for storage in memory or for display on a display device. The exchanged data can include data to be stored in memory, or data already stored in memory, to read, write, or edit data.

Connectivity 1770 can include multiple different types of connectivity. To generalize, device 1700 is illustrated with cellular connectivity 1772 and wireless connectivity 1774. Cellular connectivity 1772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 1774 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 1780 include hardware interfaces and connectors, as well as software components (e.g., drivers, protocol stacks) to make peripheral connections. It will be understood that device 1700 could both be a peripheral device ("to" 1782) to other computing devices, as well as have peripheral devices ("from" 1784) connected to it. Device 1700 commonly has a "docking" connector to connect to other computing devices for purposes such as managing (e.g., downloading, uploading, changing, synchronizing) content on device 1700. Additionally, a docking connector can allow device 1700 to connect to certain peripherals that allow device 1700 to control content output, for example, to audiovisual or other systems.

In addition to a proprietary docking connector or other proprietary connection hardware, device 1700 can make peripheral connections 1780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, system 1700 includes elements of a land use management or manager 1790 (alternately referred to as management system 1790) in accordance with any embodiment described throughout. Typically, system 1700 would represent a computing device through which a user accesses a server that execute the management system. However, system 1700 can represent one embodiment of a computing device that executes management system 1790. Management system 1790 exists within system 1700 as components for execution. As illustrated, code, data, and objects can be stored within memory subsystem 1760 for execution. Processor 1710 executes the code and objects, and uses the data to perform the functions of the management system. Thus, components of management system 1790 within system 1700 configure the hardware components of system 1700 to provide the functions described in embodiments of a management system described throughout. It will be understood that either as a server or as an accessing device, system 1700 can access the other side of the operation (i.e., either the client side or the server side) via network connectivity component 1770.

Figure 18:
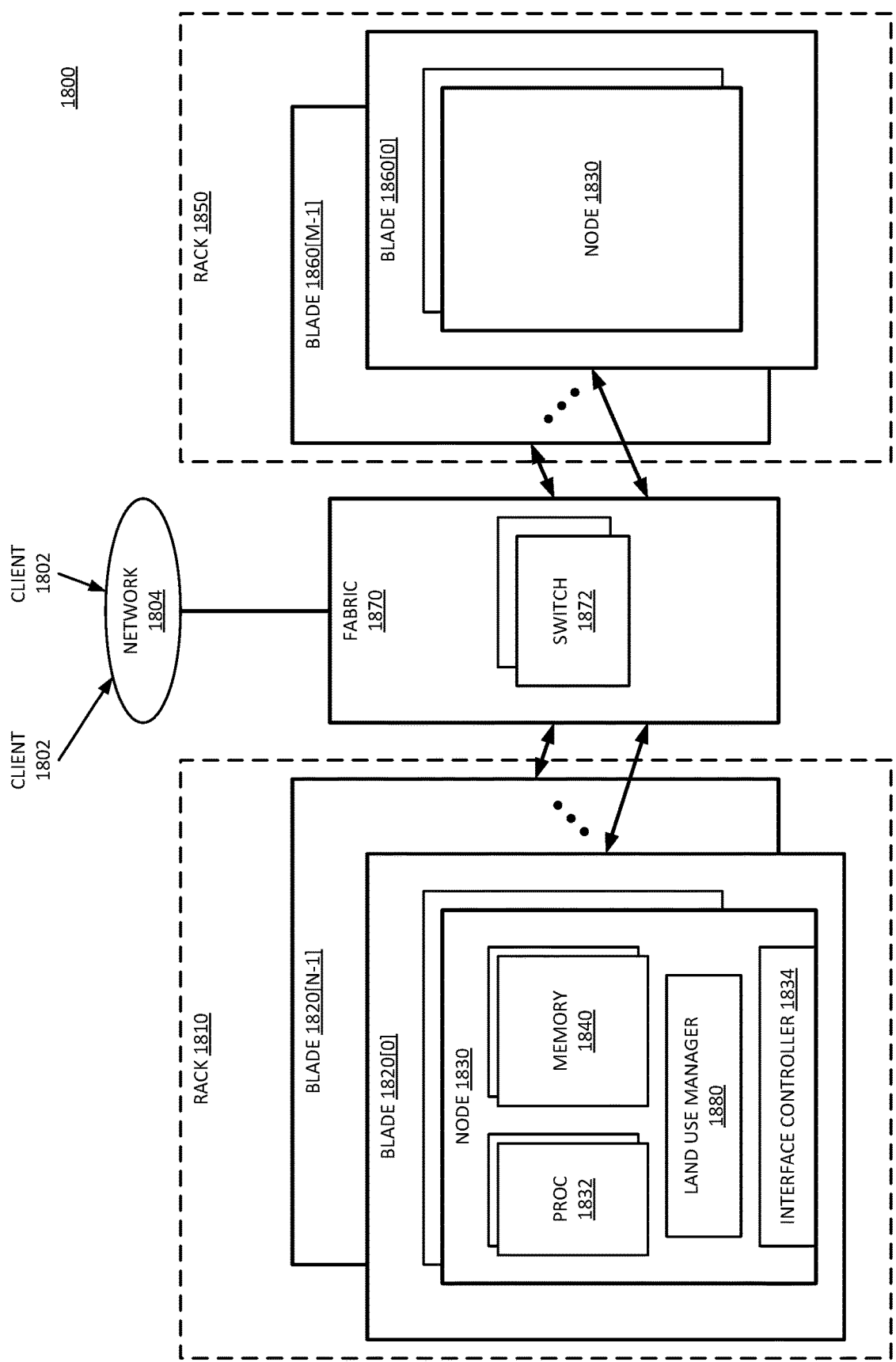
FIG. 18 is a block diagram of an embodiment of a multi-node network in which real property rights management can be implemented.

FIG. 18 is a block diagram of an embodiment of a multi-node network in which real property rights management can be implemented. System 1800 represents a data center or cloud server. In one embodiment, system 1800 represents a server farm. In one embodiment, system 1800 represents a data cloud or a processing cloud. System 1800 can include one or more computing devices in accordance with system 1600.

One or more clients 1802 make requests over network 1804 to system 1800. Network 1804 represents one or more local networks, or wide area networks, or a combination. Clients 1802 can be human or machine clients, which generate requests for the execution of operations by system 1800. System 1800 executes applications or data computation tasks requested by clients 1802.

In one embodiment, system 1800 includes one or more racks, which represent structural and interconnect resources to house and interconnect multiple computation nodes. In one embodiment, rack 1810 includes multiple nodes 1830. In one embodiment, rack 1810 hosts multiple blade components 1820. Hosting refers to providing power, structural or mechanical support, and interconnection. Blades 1820 can refer to computing resources on printed circuit boards (PCBs), where a PCB houses the hardware components for one or more nodes 1830. In one embodiment, blades 1820 do not include a chassis or housing or other "box" other than that provided by rack 1810. In one embodiment, blades 1820 include housing with exposed connector to connect into rack 1810. In one embodiment, system 1800 does not include rack 1810, and each blade 1820 includes a chassis or housing that can stack or otherwise reside in close proximity to other blades and allow interconnection of nodes 1830.

System 1800 includes fabric 1870, which represents one or more interconnectors for nodes 1830. In one embodiment, fabric 1870 includes multiple switches 1872 or routers or other hardware to route signals among nodes 1830. Additionally, fabric 1870 can couple system 1800 to network 1804 for access by clients 1802. In addition to routing equipment, fabric 1870 can be considered to include the cables or ports or other hardware equipment to couples nodes 1830 together. In one embodiment, fabric 1870 has one or more associated protocols to manage the routing of signals through system 1800. In one embodiment, the protocol or protocols is at least partly dependent on the hardware equipment used in system 1800.

As illustrated, rack 1810 includes N blades 1820. In one embodiment, in addition to rack 1810, system 1800 includes rack 1850. As illustrated, rack 1850 includes M blades 1860. M is not necessarily the same as N; thus, it will be understood that various different hardware equipment components could be used, and coupled together into system 1800 over fabric 1870. Blades 1860 can be the same or similar to blades 1820. Nodes 1830 can be any type of node as described herein, and are not necessarily all the same type of node. System 1800 is not limited to being homogenous, nor is it limited to not being homogenous.

For simplicity, only the node in blade 1820[0] is illustrated in detail. However, other nodes in system 1800 can be the same or similar. At least some nodes 1830 are computation nodes, with processor 1832 and memory 1840. A computation node refers to a node with processing resources (e.g., one or more processors) that executes an operating system and can receive and process one or more tasks. In one embodiment, at least some nodes 1830 are storage server nodes with a server as processing resources 1832 and memory 1840. A storage server refers to a node with more storage resources than a computation node, and rather than having processors for the execution of tasks, a storage server includes processing resources to manage access to the storage nodes within the storage server.

In one embodiment, node 1830 includes interface controller 1834, which represents logic to control access by node 1830 to fabric 1870. The logic can include hardware resources to interconnect to the physical interconnection hardware. The logic can include software or firmware logic to manage the interconnection. In one embodiment, interface controller 1834 is or includes a host fabric interface (HFI). Node 1830 includes memory subsystem 1840, which provides storage services for data to be computed by processors 1832. Processor 1832 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory 1840 can be or include memory devices and a memory controller.

In one embodiment, node 1830 includes land use manager 1880, which represents elements of a land use management system in accordance with any embodiment described throughout. Land use manager 1880 exists within system 1800 as components for execution. As illustrated, code, data, and objects can be stored within node 1830 for execution. Multiple nodes 1830 can include multiple instances of land use manager 1880, or components of land use manager 1880 can be spread across multiple nodes 1830. Land use manager 1880 in system 1800 enables the providing of land use management services over network 1804 to clients 1802.

In one embodiment, the management system can instantaneously detect overconveyance and strangers in title (i.e., a name that has not been tied back to a conveyance document), or other errors, or a combination, in the chain of title. As stated before, human understanding does not normally comprehend information in dimensions beyond three. However, representing the conveyances as intervals and sets can enable the management system to quickly and correctly identify errors in conveyance information.

In one embodiment, the management system can display information based on time, percentage ownership, or alphabetical order of conveyor names/aliases, or a combination. In one embodiment, the management system can rearrange the view based on recent conveyances instead of alphabetical order. In one embodiment, the rendering engine enables the representation of information based on individual conveyors. In one embodiment, the graphical representation is organized based on which conveyance documents are associated with which individuals or parties.

As explained above, as use rights expand, the traditional methods used to track actual ownership rights gets exponentially more complex. Current mechanisms for tracking rights are inadequate, and people do not track adequately. Traditional conveyance management involves the use of a number of assumptions that are made when conveying, and based on the multidimensional complexity involved in tracking, such assumptions cannot adequately track rights.

From one perspective, the management system performs indexing of the conveyance information. In one embodiment, the management system sets up indexing with the intervals. In one embodiment, the management system applies set operations to intervals rather than traditional sets. That enables the system to apply set operations to multidimensional computation problems. In one embodiment, the management system organizes all conveyance information in set form. In one embodiment, with intervals and sets, the specific intervals can be separated via conveyances. The original conveyances can be preserved to be applied against later conveyances. Such management can prevent "merging" back rights based only on scalar percentages, which could mix conveyances.

In one aspect, a method includes: representing each of multiple land use rights as a bounded space, where a portion of a whole right is a specifically designated subspace within the bounded space; and tracking land use rights conveyances as subdivisions of whole or partial subspaces within the bounded space, including performing set operations to compute the subdivisions.

In one embodiment of the method, representing each of the multiple land use rights as a bounded space further comprises representing the land use rights as objects having the bounded space, and representing a subspace as an object having a specifically designated interval portion of the bounded space, including defined starting and ending points of the interval to preserve the specific right conveyed. In one embodiment of the method, tracking the land use rights conveyances further comprises performing a set operation on separate subspaces to compute a subdivision conveyed. In one embodiment of the method, performing the set tracking the land use rights conveyances further comprises performing the set operation comprises performing a union operation between two or more subspaces. In one embodiment of the method, performing the set tracking the land use rights conveyances further comprises performing the set operation comprises performing an intersection operation between two or more subspaces. In one embodiment of the method, tracking the land use rights conveyances further comprises tracking conveyances based on all of: right type, x-axis and y-axis tract dimensions, z-axis land depth, mineral type, and time. In one embodiment of the method, tracking the land use rights conveyances comprises computing a subdivision conveyed based on right type intervals, x-axis tract dimension intervals, y-axis tract dimension intervals, z-axis land depth intervals, mineral type intervals, and time intervals.

In one aspect, an apparatus includes hardware and/or software components to execute operations in accordance with any embodiment of the method. In one aspect, an article of manufacture comprising a computer readable storage medium having content stored thereon, which when executed by a machine performs operations to execute any embodiment of the method.

In one aspect, a method includes: computing land use rights conveyances as conveyances of specified intervals of a whole land use right, where each interval includes a starting and ending point within the whole land use right, the conveyances based on conveyance instruments; generating a graphical representation of the conveyance instruments, including representing the conveyance instruments ordered in accordance with specific rights intervals affected by the respective conveyance instruments; and generating relationship lines between graphical representations of conveyance instruments, each relationship line indicating an influence of the conveyance instrument on one or more other conveyance instruments to which it is connected.

In one embodiment of the method, generating the graphical representation further comprises generating a flowchart of conveyance instruments. In one embodiment of the method, generating the relationship lines comprises generating a relationship line between representations of two conveyance instruments to indicate an influence per interval for at least one right type, and for one or more of: x-axis tract dimension, y-axis tract dimension, z-axis land depth, mineral type, or time. In one embodiment of the method, computing the land use rights conveyances further comprises performing operations in accordance with any embodiment of the method for computing land use rights.

In one aspect, an apparatus includes hardware and/or software components to execute operations in accordance with any embodiment of the method. In one aspect, an article of manufacture comprising a computer readable storage medium having content stored thereon, which when executed by a machine performs operations to execute any embodiment of the method.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for land use rights management, comprising:
representing land use rights as bounded spaces, where a whole land use right is embodied as a computer object having a whole bounded space with an interval from a start point to an end point, and a partial land use right is embodied as a computer object having a partial bounded space as a specifically designated subspace within the whole bounded space of the whole land use right, with the partial bounded space less than the interval from the start point to the end point;
managing land use rights conveyances through interactions of the computer objects, including computing a subdivision of land use rights for a land use rights conveyance by performing set operations on an interaction of whole bounded spaces and/or on partial bounded spaces of a first computer object representing first land use rights with a second computer object representing second land use rights, the subdivision of land use rights computed for a subdivision of land use rights conveyed; and
generating a third computer object from the interaction of the first computer object with the second computer object to represent the land use rights conveyed.

2. The method of claim 1, wherein managing the land use rights conveyances further comprises performing a set operation on a partial bounded space of the first computer object with a partial bound space of the second computer object to compute the subdivision of land use rights conveyed.

3. The method of claim 2, wherein performing the set operation comprises performing a union operation between the partial bounded space of the first computer object and the partial bounded space of the second computer object to compute a joinder of land use rights conveyed.

4. The method of claim 2, wherein performing the set operation comprises performing an intersection operation between the partial bounded space of the first computer object and the partial bounded space of the second computer object to compute a division of land use rights conveyed.

5. The method of claim 1, wherein managing the land use rights conveyances further comprises tracking conveyances based on a combination of at least two of: right type, x-axis and y-axis tract dimensions, z-axis land depth, mineral type, and time.

6. The method of claim 1, wherein managing the land use rights conveyances further comprises tracking conveyances based on all of: right type, x-axis and y-axis tract dimensions, z-axis land depth, mineral type, and time.

7. The method of claim 6, wherein managing the land use rights conveyances comprises computing a subdivision conveyed based on right type intervals, x-axis tract dimension intervals, y-axis tract dimension intervals, z-axis land depth intervals, mineral type intervals, and time intervals.

8. A computing device for land use management, comprising:
a memory device to store data related to land use rights conveyances; and
a processor configured to generate multiple computer objects to represent the land use rights conveyances, including to represent land use rights as bounded spaces, where a whole land use right is embodied as a computer object having a whole bounded space with an interval from a start point to an end point, and a partial land use right is embodied as a computer object having a partial bounded space as a specifically designated subspace within the whole bounded space of the whole land use right, with the partial bounded space less than the interval from the start point to the end point; the processor configured to manage land use rights conveyances through interactions of the computer objects, including computation of a subdivision of land use rights for a land use rights conveyance by execution of set operations on an interaction of whole bounded spaces and/or on partial bounded spaces of a first computer object representing first land use rights with a second computer object representing second land use rights, the subdivision of land use rights computed for a subdivision of land use rights conveyed; and to generate a third computer object from the interaction of the first computer object with the second computer object to represent the land use rights conveyed.

9. The computing device of claim 8, wherein the processor is to manage the land use rights conveyances including to perform a set operation on a partial bounded space of the first computer object with a partial bound space of the second computer object to compute the subdivision of land use rights conveyed.

10. The computing device of claim 9, wherein the processor is to perform a union operation between the partial bounded space of the first computer object and the partial bounded space of the second computer object to compute a joinder of land use rights conveyed.

11. The computing device of claim 9, wherein the processor is to perform an intersection operation between the partial bounded space of the first computer object and the partial bounded space of the second computer object to compute a division of land use rights conveyed.

12. The computing device of claim 8, wherein the processor is to manage the land use rights conveyances including to manage conveyances based on a combination of at least two of: right type, x-axis and y-axis tract dimensions, z-axis land depth, mineral type, and time.

13. The computing device of claim 8, wherein the processor is to manage the land use rights conveyances including to manage conveyances based on all of: right type, x-axis and y-axis tract dimensions, z-axis land depth, mineral type, and time.

14. The computing device of claim 13, wherein the processor is to manage the land use rights conveyances including to compute a subdivision conveyed based on right type intervals, x-axis tract dimension intervals, y-axis tract dimension intervals, z-axis land depth intervals, mineral type intervals, and time intervals.

15. A non-transitory computer readable storage medium storing content, which when accessed, provides instructions to cause a machine to execute a method for land use rights management, comprising:
representing land use rights as bounded spaces, where a whole land use right is embodied as a computer object having a whole bounded space with an interval from a start point to an end point, and a partial land use right is embodied as a computer object having a partial bounded space as a specifically designated subspace within the whole bounded space of the whole land use right, with the partial bounded space less than the interval from the start point to the end point;
managing land use rights conveyances through interactions of the computer objects, including computing a subdivision of land use rights for a land use rights conveyance by performing set operations on an interaction of whole bounded spaces and/or on partial bounded spaces of a first computer object representing first land use rights with a second computer object representing second land use rights, the subdivision of land use rights computed for a subdivision of land use rights conveyed; and generating a third computer object from the interaction of the first computer object with the second computer object to represent the land use rights conveyed.

16. The computer readable storage medium of claim 15, wherein managing the land use rights conveyances further comprises performing a set operation on a partial bounded space of the first computer object with a partial bound space of the second computer object to compute the subdivision of land use rights conveyed.

17. The computer readable storage medium of claim 16, wherein performing the set operation comprises performing a union operation between the partial bounded space of the first computer object and the partial bounded space of the second computer object to compute a joinder of land use rights conveyed.

18. The computer readable storage medium of claim 16, wherein performing the set operation comprises performing an intersection operation between the partial bounded space of the first computer object and the partial bounded space of the second computer object to compute a division of land use rights conveyed.

19. The computer readable storage medium of claim 15, wherein managing the land use rights conveyances further comprises tracking conveyances based on a combination of at least two of: right type, x-axis and y-axis tract dimensions, z-axis land depth, mineral type, and time.

20. The computer readable storage medium of claim 15, wherein managing the land use rights conveyances comprises computing a subdivision conveyed based on right type intervals, x-axis tract dimension intervals, y-axis tract dimension intervals, z-axis land depth intervals, mineral type intervals, and time intervals.

* * * * *